United States Patent
Ohata et al.

(10) Patent No.: US 11,905,000 B2
(45) Date of Patent: Feb. 20, 2024

(54) FLYING DEVICE, ELECTRONIC DEVICE, AND PROGRAM

(71) Applicant: NIKON CORPORATION, Tokyo (JP)

(72) Inventors: Katsuki Ohata, Zurich (CH); Takanori Shioda, Tokyo (JP); Marie Shimoyama, Tokyo (JP); Toru Kijima, Yokohama (JP); Shinichi Miyauchi, Toda (JP); Sho Nakamura, Zurich (CH); Ryo Tsubata, Kawasaki (JP); Masaki Kaneko, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/089,643

(22) PCT Filed: Mar. 23, 2017

(86) PCT No.: PCT/JP2017/011789
§ 371 (c)(1),
(2) Date: Sep. 28, 2018

(87) PCT Pub. No.: WO2017/170148
PCT Pub. Date: Oct. 5, 2017

(65) Prior Publication Data
US 2019/0176967 A1 Jun. 13, 2019

(30) Foreign Application Priority Data

Mar. 31, 2016 (JP) ................... 2016-072510
Mar. 31, 2016 (JP) ................... 2016-072511
Mar. 31, 2016 (JP) ................... 2016-072512

(51) Int. Cl.
*B64C 13/18* (2006.01)
*B64D 47/08* (2006.01)
(Continued)

(52) U.S. Cl.
CPC .............. *B64C 13/18* (2013.01); *B64C 13/20* (2013.01); *B64C 39/024* (2013.01); *B64D 47/08* (2013.01);
(Continued)

(58) Field of Classification Search
CPC ....... B64C 13/18; B64C 13/20; B64C 39/024; B64C 2201/141; B64C 2201/146;
(Continued)

(56) References Cited

U.S. PATENT DOCUMENTS

2008/0221730 A1* 9/2008 Sakata ................... G06N 3/004
700/245
2014/0104630 A1 4/2014 Baba
(Continued)

FOREIGN PATENT DOCUMENTS

CN 103731575 A 4/2014
CN 105278544 A * 1/2016
(Continued)

OTHER PUBLICATIONS

Oct. 18, 2019 Search Report issued in European Patent Application No. 17774686.4.
(Continued)

*Primary Examiner* — Maceeh Anwari
(74) *Attorney, Agent, or Firm* — Oliff PLC

(57) ABSTRACT

A flying device includes a flight unit; and a flight control unit that performs, in a case where a flight position by the flight unit is out of a predetermined range, a control that is different from a control in a case where the flight position is within the predetermined range.

19 Claims, 12 Drawing Sheets

(51) Int. Cl.
  *G05D 1/00* (2006.01)
  *B64C 13/20* (2006.01)
  *B64C 39/02* (2006.01)
  *G05D 1/10* (2006.01)

(52) U.S. Cl.
  CPC .............. *G05D 1/00* (2013.01); *G05D 1/0022* (2013.01); *G05D 1/0033* (2013.01); *G05D 1/101* (2013.01); *B64C 2201/10* (2013.01); *B64C 2201/20* (2013.01)

(58) Field of Classification Search
  CPC ...... G05D 1/0033; G05D 1/00; G05D 1/0022; G05D 1/101; B64D 47/08
  USPC .......................................................... 701/11
  See application file for complete search history.

(56) References Cited

U.S. PATENT DOCUMENTS

| | | | |
|---|---|---|---|
| 2016/0068267 A1* | 3/2016 | Liu | ...................... G05D 1/0061 701/11 |
| 2017/0123413 A1 | 5/2017 | Ye et al. | |
| 2018/0107213 A1 | 4/2018 | Kuhara | |

FOREIGN PATENT DOCUMENTS

| | | | |
|---|---|---|---|
| CN | 105278544 A | | 1/2016 |
| EP | 3163394 A1 | * | 3/2017 |
| JP | 2008-246665 A | | 10/2008 |
| JP | 2012-83318 A | | 4/2012 |
| JP | 2014-053821 A | | 3/2014 |
| JP | 2014-119828 A | | 6/2014 |
| JP | 201453821 A | * | 3/2015 |
| JP | 2017-119501 A | | 7/2017 |
| JP | 2017119501 | * | 7/2017 |
| WO | 2017/022179 A1 | | 2/2017 |

OTHER PUBLICATIONS

Jun. 20, 2017 International Search Report issued in International Patent Application No. PCT/JP2017/011789.
Apr. 6, 2021 Office Action issued in Japanese Patent Application No. 2018-509193.
May 31, 2021 Office Action issued in Chinese Patent Application No. 201780020918.4.
Oct. 10, 2022 Decision of Rejection issued in Chinese Patent Application No. 201780020918.4.
Jan. 25, 2022 Office Action issued in Chinese Patent Application No. 201780020918.4.
May 7, 2022 Office Action issued in Chinese Patent Application No. 201780020918.4.
Nov. 24, 2021 Office Action issued in Japanese Patent Application No. 2018-509193.

* cited by examiner

| THRESHOLD | | | | | INFORMATION FOR SETTING RANGE | | | |
|---|---|---|---|---|---|---|---|---|
| DISTANCE THRESHOLD | FACE PROPORTION THRESHOLD | MOTION AMOUNT THRESHOLD | ANGLE THRESHOLD | VISUAL ACUITY | MANEUVERING EXPERIENCE | LOCATION | WEATHER | WEATHER (WIND STRENGTH) |
| 10m | 1/20 | 4m/s | 90 DEGREES | 1.5 OR MORE | A | FIELD OR GRASSLAND | SUNNY | 0 |
| 7m | 1/10 | 3m/s | 75 DEGREES | FROM 1.0 TO LESS THAN 1.5 | B | – | – | 1 OR 2 |
| 5m | 1/5 | 2m/s | 60 DEGREES | FROM 0.7 TO LESS THAN 1.0 | C | SUBURBS | CLOUDY | 3 |
| 3m | 1/4 | 1m/s | 45 DEGREES | FROM 0.5 TO LESS THAN 0.7 | D | CITY TOWN | – | 4 OR 5 |
| 2m | 1/3 | 0.5m/s | 30 DEGREES | LESS THAN 0.5 | E | INDOORS | RAINY | 6 OR MORE |

(b)

| CORRECTION COEFFICIENT k OF THRESHOLD | | | | INFORMATION FOR SETTING RANGE | | | |
|---|---|---|---|---|---|---|---|
| CORRECTION COEFFICIENT k1 OF DISTANCE THRESHOLD | CORRECTION COEFFICIENT k2 OF FACE PROPORTION THRESHOLD | CORRECTION COEFFICIENT k3 OF MOTION AMOUNT THRESHOLD | CORRECTION COEFFICIENT k4 OF ANGLE THRESHOLD | VISUAL ACUITY | MANEUVERING EXPERIENCE | LOCATION | WEATHER | WEATHER (WIND STRENGTH) |
| 3 | 0.3 | 3 | 3 | 1.5 OR MORE | A | FIELD OR GRASSLAND | SUNNY | 0 |
| 2 | 0.5 | 2 | 2 | FROM 1.0 TO LESS THAN 1.5 | B | – | – | 1 OR 2 |
| 1 | 1 | 1 | 1 | FROM 0.7 TO LESS THAN 1.0 | C | SUBURBS | CLOUDY | 3 |
| 0.5 | 2 | 0.5 | 0.5 | FROM 0.5 TO LESS THAN 0.7 | D | CITY TOWN | – | 4 OR 5 |
| 0.3 | 3 | 0.3 | 0.3 | LESS THAN 0.5 | E | INDOORS | RAINY | 6 OR MORE |

FLYING DEVICE, ELECTRONIC DEVICE, AND PROGRAM

TECHNICAL FIELD

The present invention relates to a flying device, an electronic device, and a program.

BACKGROUND ART

In recent years, small unmanned aerial vehicles are used in various fields. For example, PTL1 describes an autonomous flight robot that flies to follow a moving object such as an intruder and acquires an evidence image of the moving object such as the intruder. However, it was impossible to control a flight of an air vehicle within a range in which an operator (user) does not lose sight of the air vehicle.

CITATION LIST

Patent Literature

PTL1: Japanese Laid-Open Patent Publication No. 2014-119828

SUMMARY OF INVENTION

A flying device according to a first aspect of the present invention comprises: a flight unit; and a flight control unit that performs, in a case where a flight position by the flight unit is out of a predetermined range, a control that is different from a control in a case where the flight position is within the predetermined range.

A program, according to a second aspect of the present invention, causes a computer to perform, in a case where a flight position by a flight unit is out of a predetermined range, a control that is different from a control in a case where the flight position is within the predetermined range.

A flying device according to a third aspect of the present invention comprises: a flight unit; an acquiring unit that acquires information on a user; and a flight control unit that causes the flight unit to fly within a range in which the user can check, with a flight signal based on the information on the user.

An electronic device according to a fourth aspect of the present invention comprises: an acquiring unit that acquires predetermined information; and an estimation unit that estimates whether or not a user currently visually recognizes a flying device based on the predetermined information.

A flying device that flies within a set range according to a fifth aspect of the present invention comprises: a flight unit; an acquiring unit that acquires information for setting the range; and a flight control unit that flies the flight unit within the range set based on predetermined conditions and the information.

An electronic device according to a sixth aspect of the present invention comprises: an acquiring unit that acquires predetermined information; and a setting unit that sets a threshold for estimating whether or not a user currently visually recognizes a flight device, based on the predetermined information.

BRIEF DESCRIPTION OF DRAWINGS

FIG. 10 illustrates examples for setting a flight range.

DESCRIPTION OF EMBODIMENTS

Figure 1:
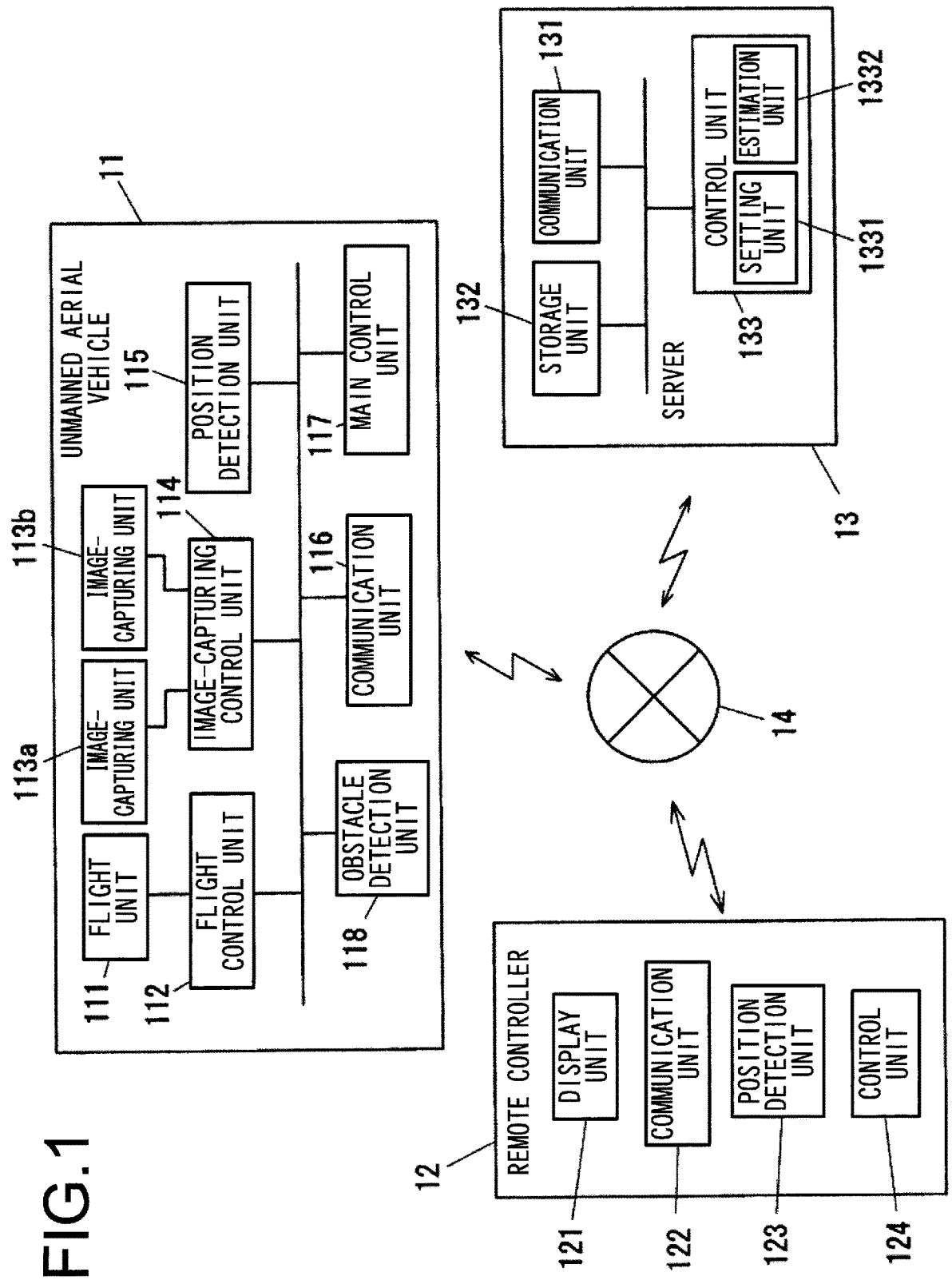
FIG. 1 is a block diagram illustrating an example of a flight system including an unmanned aerial vehicle.

Embodiments for carrying out the present invention will now be described with reference to the drawings. The present embodiment relates to unmanned aerial vehicles (e.g., drones, radio-controlled devices). FIG. 1 is a block diagram illustrating an example of a flight system including an unmanned aerial vehicle. The flight system illustrated in FIG. 1 may include an unmanned aerial vehicle 11, a remote controller 12 for maneuvering the unmanned aerial vehicle 11, and a server 13 including a host computer which runs server software for providing various operations in response to a request from a client. The unmanned aerial vehicle 11, the remote controller 12, and the server 13 are connected to a communication network 14. The remote controller 12 may be a mobile device such as a mobile phone, instead of a dedicated maneuvering tool.

Note that the remote controller 12 may be not necessarily included in the flight system. For example, the unmanned aerial vehicle 11 may autonomously fly without receiving control instructions from another device such as the remote controller 12, or the unmanned aerial vehicle 11 may fly while receiving control instructions from the server 13, instead of the remote controller 12. The server 13 may also not necessarily included in the flight system. For example, at least one of the unmanned aerial vehicle 11 and the remote controller 12 may undertake functions for which otherwise the server 13 is responsible, so that the server 13 may be not included in the flight system. Neither the remote controller 12 nor the server 13 may be included in the flight system.

In the present embodiment, for the purpose of illustration, the unmanned aerial vehicle 11 flies in accordance with control instructions of the remote controller 12.

(Configuration of Unmanned Aerial Vehicle 11)

The unmanned aerial vehicle 11 may include a flight unit 111 having at least one or more propellers, a flight control unit 112 that controls the flight unit 111, image-capturing units 113a, 113b, an image-capturing control unit 114, a position detection unit 115, a communication unit 116, a main control unit 117, an obstacle detection unit 118, and the like.

The flight unit 111 has at least one or more propellers.

The flight control unit 112 can control the propellers provided in the flight unit 111 by a control system. When a plurality of propellers is provided in the flight unit 111, the flight control unit 112 may control the propellers individually and independently by the control system. The flight control unit 112 can generate a signal for controlling the flight unit 111, to control the flight unit 111. Further, the flight control unit 112 may control the flight unit 111 based on a signal generated by the server 13.

The image-capturing units 113a, 113b are cameras equipped with electronic image sensors such as MOS image sensors, which can capture still images and moving images. The image-capturing units 113a, 113b are able to control zooming, autofocus, automatic exposure, and the like. Additionally, each of the image-capturing units 113a, 113b is mounted on a separate gimbal (rotary table) so that its field-of-view direction can be changed in the vertical and horizontal directions with respect to the main body of the unmanned aerial vehicle. The image-capturing unit 113a is a camera for tracking an operator (user). The image-capturing unit 113b is a camera for photographing the surroundings of the unmanned aerial vehicle 11. Note that the "operator" as used here includes a user using the unmanned aerial vehicle 11. In this description, the operator includes a user of an unmanned aerial vehicle in a case where the unmanned aerial vehicle 11 automatically and autonomously flies, that is, in a case where the user does not need to maneuver the vehicle.

The image-capturing control unit 114 can control the image-capturing units 113a, 113b to capture an image of the operator. Additionally, the image-capturing control unit 114 can individually control gimbals, on which the image-capturing units 113a, 113b are mounted, so that the image-capturing units 113a, 113b face to the operator.

Note that the two image-capturing units 113a, 113b are controlled by one image-capturing control unit 114 in the example illustrated in FIG. 1; however, each of the image-capturing units 113a, 113b may be provided with an individual image-capturing control unit. Furthermore, it is not necessary to provide two image-capturing units. A single image-capturing unit may function as both of the image-capturing units 113a, 113b. For example, a camera that can photograph 180 degrees or a camera that can photograph 360 degrees may be used.

The position detection unit 115 can detect the position of the unmanned aerial vehicle 11. In other words, the position detection unit 115 can detect the position of the own vehicle (the unmanned aerial vehicle 11). For example, the position detection unit 115 may receive a signal transmitted from a GPS satellite to detect the position of the unmanned aerial vehicle 11 (hereinafter referred to as GPS positional information). Note that the position detection unit 115 is not necessarily provided.

The communication unit 116 can transmit various kinds of information and data, such as image data captured by the image-capturing units 113a, 113b and GPS positional information of the unmanned aerial vehicle 11, to the remote controller 12 or the server 13 via the communication network 14. Further, the communication unit 116 can receive various kinds of information and data from the remote controller 12 or the server 13 via the communication network 14. Note that the communication unit 116 is not necessarily provided. For example, the communication unit 116 may be not necessarily provided in a case where neither the remote controller 12 nor the server 13 are included in the flight system. For example, as described above, the unmanned aerial vehicle 11 does not need to have the communication unit 116 when the remote control 12 and the server 13 are not included in the flight system.

The main control unit 117 includes a microprocessor (not illustrated) and peripheral circuits including a memory, so that the main control unit 117 can control the units of the unmanned aerial vehicle 11 by executing a predetermined control program. Note that the flight control unit 112, the image-capturing control unit 114, and the main control unit 117 are provided in the example illustrated in FIG. 1; however, a single control unit may control the units.

The obstacle detection unit 118 can, for example, detect any obstacle between the unmanned aerial vehicle 11 and the operator operating the remote controller 12 (the user using the unmanned aerial vehicle 11). A specific configuration of the obstacle detection unit 118 will be described later. Note that the obstacle detection unit 118 is not necessarily provided.

Figure 3:
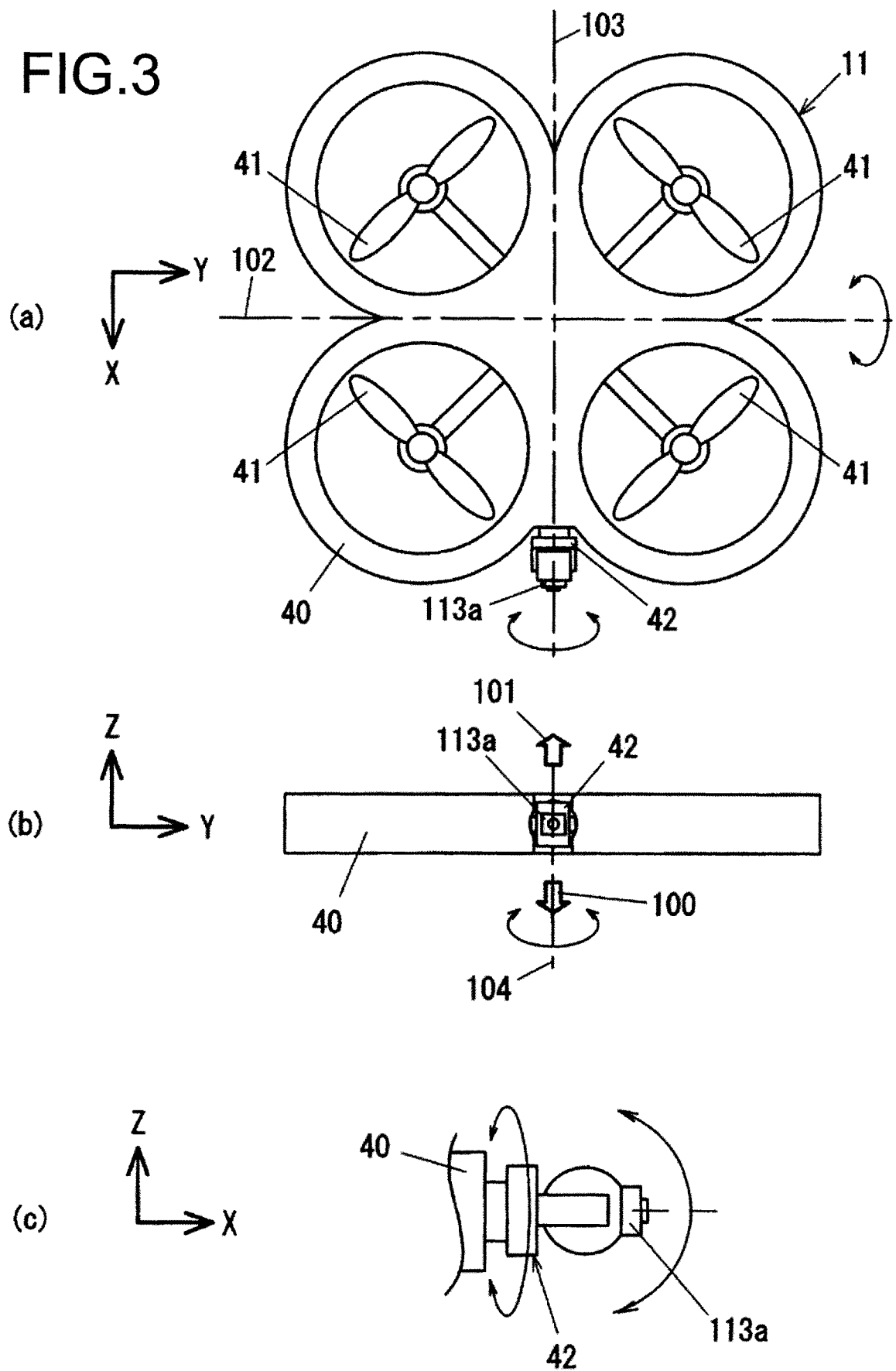
FIG. 3 shows external views of the unmanned aerial vehicle.

FIG. 3 shows schematic diagrams illustrating an exemplary external view of the unmanned aerial vehicle 11. In the example illustrated in FIG. 3, the unmanned aerial vehicle 11 is a multicopter having four propellers 41. However, the number of propellers is not limited to four and any number of propellers may be used. The four propellers 41 are provided in the same plane, and each propeller is independently controlled by the control system. This control allows the unmanned aerial vehicle 11 to turn about a pitch axis 102, turn about a roll axis 103, turn about a yaw axis 104, descend in a downward direction 100, rise in an upward direction 101, fly in a transverse direction of the vehicle body, or hover at a predetermined position in the air. Note that the propellers 41 are not necessarily provided in the same plane.

The unmanned aerial vehicle 11 may have a housing 40 that surrounds and protects the four propellers 41. The housing 40 can protect and keep the propellers 41 from being directly contact with surrounding obstacles approaching from the horizontal direction. The image-capturing unit 113a may be mounted on the gimbal 42 which can freely change the posture of the image-capturing unit 113a. Note that the description of the image-capturing unit 113b is omitted in FIG. 3; however, the image-capturing unit 113b may be mounted on a gimbal similar to the gimbal for the image-capturing unit 113a so as to photograph the surroundings of the unmanned aerial vehicle 11. Note that positions at which the image-capturing units 113a, 113b are mounted are not limited to the positions illustrated in FIG. 3. The image-capturing units 113a, 113b may be mounted on the top of or at the bottom of the unmanned aerial vehicle 11 or at any positions at which they can be mounted.

The flight control unit 112 of the unmanned aerial vehicle 11 may perform a flight control based on a control signal (flight signal) received from the remote controller 12 operated by the operator, a flight control based on a control signal (flight signal) received from the server 13, an autonomous flight control of the unmanned aerial vehicle 11 without receiving a control signal (flight signal) from another device, or the like. In any case, ensuring safety and preventing theft are desired during the flight of the unmanned aerial vehicle 11. Additionally, some operators desire to allow the unmanned aerial vehicle 11 to fly within a range in which the operators can always watch the unmanned aerial vehicle 11. For this purpose, it is conceivable to allow the unmanned aerial vehicle 11 to fly within a range in which the operator can monitor the unmanned aerial vehicle 11 or within a preset predetermined range. It is also conceivable to appropriately estimate whether the operator can currently monitor the unmanned aerial vehicle 11. Note that "within a range in which the operator can monitor the unmanned aerial vehicle" or "within a preset predetermined range" as used here includes "within a range in which the operator can check (visually recognize, visually observe) the unmanned aerial vehicle 11", "within a range in which the operator does not lose sight of the unmanned aerial vehicle 11", "within a range in which operations from the operator are accepted", and the like.

(Configuration of Remote Controller 12)

Returning to FIG. 1, a configuration of the remote controller 12 will be described. The remote controller 12 may include a display unit 121, a communication unit 122, a position detection unit 123, a control unit 124, and the like.

The display unit 121 can display various kinds of information and data, such as image data captured by the image-capturing units 113a, 113b of the unmanned aerial vehicle 11.

The communication unit 122 can transmit and receive various kinds of information and data to/from the unmanned aerial vehicle 11 or the server 13 via the communication network 14.

The position detection unit 123 receives a signal transmitted from a GPS satellite to detect the position of the remote controller 12 (hereinafter referred to as GPS positional information). The GPS positional information of the remote controller 12 may be transmitted from the communication unit 122 to the unmanned aerial vehicle 11 or the server 13.

The control unit 124 can control the units of the remote controller 12 by executing a predetermined control program.

Note that the display unit 121 or the position detection unit 123 is not necessarily provided.

(Configuration of Server 13)

Referring to FIG. 1, a configuration of the server 13 will be described. The server 13 includes a communication unit 131, a storage unit 132, a control unit 133, and the like. Further, the control unit 133 may include a setting unit 1331, an estimation unit 1332, and the like.

The communication unit 131 can transmit and receive various kinds of data to/from the unmanned aerial vehicle 11 or the remote controller 12 via the communication network 14.

The storage unit 132 can store various kinds of data, such as data required for a flight control. In other words, the storage unit 132 can store data required for estimating whether the operator lost sight of the unmanned aerial vehicle 11 (whether the operator can currently check the unmanned aerial vehicle 11, or whether the unmanned aerial vehicle 11 is flying within a predetermined range) as described later, data on the operator, data on the unmanned aerial vehicle, other data (e.g., map information, weather information), and the like. For example, data on the operator includes IDs, facial features, attribute data (e.g., sex, age, visual acuity, height, weight, maneuvering experience), and the like. Data on the unmanned aerial vehicle includes size, color, battery life, other information on performance, and the like.

The control unit 133 includes a microprocessor (not illustrated) and peripheral circuits including a memory, so that the control unit 133 can control the units of the server 13 by executing a predetermined control program. Further, the control unit 133 may include the setting unit 1331, the estimation unit 1332, and the like.

The setting unit 1331 can set a predetermined range in which the unmanned aerial vehicle 11 is permitted to fly. In other words, it is possible to set a range in which the operator does not lose sight of the unmanned aerial vehicle 11 (or the operator can check the unmanned aerial vehicle 11). The setting unit 1331 can set conditions (e.g., thresholds) for estimating whether the operator lost sight of the unmanned aerial vehicle 11 (or whether the operator can currently check the unmanned aerial vehicle 11). A range in which operations from the operator are accepted can be set. Details will be described later.

The estimation unit 1332 can estimate whether the flight position of the unmanned aerial vehicle 11 is within or out of the predetermined range. In other words, the estimation unit 1332 can estimate whether the flight position of the unmanned aerial vehicle 11 is within or out of the range set by the setting unit 1331. Details will be described later.

(Control of Unmanned Aerial Vehicle 11)

Figure 6:
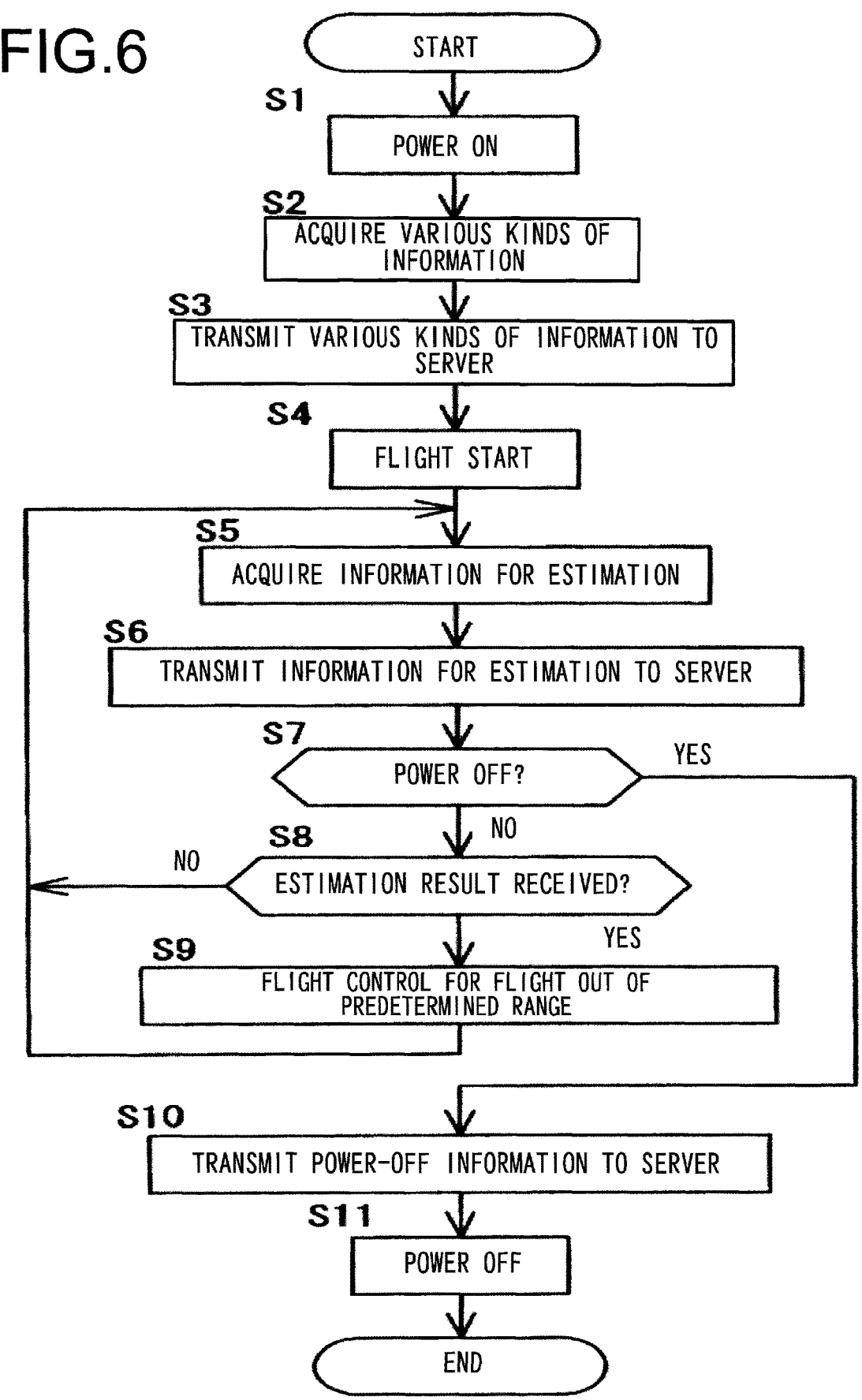
FIG. 6 is a flowchart relating to a control process of the unmanned aerial vehicle.

FIG. 6 is an example of a flowchart illustrating a control process of the unmanned aerial vehicle 11.

(Step S1)

When the operator instructs power-on (e.g., the operator operates the remote controller 12 or a power button on the unmanned aerial vehicle 11), the main control unit 117 turns on the power of the unmanned aerial vehicle 11 and the process proceeds to step S2.

(Step S2)

The main control unit 117 controls the communication unit 116 and the image-capturing control unit 114 controls the image-capturing unit 113a to acquire various kinds of information. The various kinds of information include information for setting a predetermined range in which the unmanned aerial vehicle 11 is permitted to fly, information for authenticating (or identifying) the operator, and the like. Methods of acquiring various kinds of information will be described in detail mainly in a first embodiment. Further, the timing of acquiring various kinds of information is not limited thereto. The information may be acquired at a predetermined timing. The information may be automatically acquired at a predetermined timing. Upon completion of the process of step S2, the process proceeds to step S3.

(Step S3)

The main control unit 117 controls the communication unit 116 to transmit the various kinds of information acquired in step S2 to the server 13. Note that the timing of transmitting various kinds of information is not limited thereto. The information may be transmitted to the server 13 at a predetermined timing whenever necessary. The information may be automatically transmitted. As a result, the server 13 can perform a process of authenticating the operator based on the acquired information. Further, the server 13 can set a predetermined range based on the acquired information. Upon completion of the process of step S3, the process proceeds to step S4.

(Step S4)

The flight control unit 112 controls the flight unit 111 to fly. Note that the timing at which the flight control unit 112 flies the flight unit 111 is not necessarily this timing. The flight may be started at the timing of step S1 or before or after other steps. When the communication unit 116 receives a signal from the remote controller 12, the flight control unit 112 controls the flight unit 111 based on the received signal. Note that the flight control unit 112 may control the flight unit 111 based on a signal received from the server 13. Alternatively, the flight control unit 112 may generate a control signal based on information received from the remote controller 11 or the server 13, and the flight unit 111 may fly based on the generated control signal. The flight control unit 112 may autonomously generate a control signal without receiving a signal from another device, to control the flight unit 111. Further, the control signal may be generated by the remote controller 11 or the server 13. In this case, the communication unit 116 may receive a control signal generated by another device, and the flight control unit 112 may control the flight unit 111 based on the control signal received by the communication unit. Upon completion of the process of step S4, the process proceeds to step S5.

(Step S5)

The unmanned aerial vehicle 11 acquires various kinds of information required for estimating whether the unmanned aerial vehicle 11 is flying within a predetermined range. The main control unit 117 may control the communication unit 116 to receive and acquire information from another device. The main control unit 117 may control various sensors (not illustrated in FIG. 1) to acquire information from the sensors. The image-capturing control unit 114 may control the image-capturing unit 113a to acquire information from the image-capturing unit 113a. The timing of acquiring various kinds of information is not limited thereto. The information may be acquired at a predetermined timing. The information may be automatically acquired at a predetermined timing. Upon completion of the process of step S5, the process proceeds to step S6.

(Step S6)

The main control unit 117 controls the communication unit 116 to transmit, to the server 13, various kinds of information required for estimating whether the unmanned aerial vehicle 11 is flying within a predetermined range. The information has been acquired in step S5. The timing of transmitting various kinds of information is not limited thereto. The information may be transmitted to the server 13 at a predetermined timing whenever necessary. The information may be automatically transmitted to the server 13 at a predetermined timing or upon acquiring various kinds of information in step S5. The various kinds of information may be transmitted to the server 13 in response to a request from the server 13. Upon completion of the process of step S6, the process proceeds to step S7.

(Step S7)

The main control unit 117 judges whether power-off of the unmanned aerial vehicle 11 is instructed. If the power-off is not instructed, the process proceeds to step S8. If the power-off is instructed, the process proceeds to step S10.

(Step S8)

The main control unit 117 judges whether the communication unit 116 receives information indicating an estimation result corresponding to a case where the server 13 estimates that the unmanned aerial vehicle 11 is not flying within the predetermined range (the vehicle is flying out of the predetermined range). The information indicating the estimation result may include information transmitted by the server 13 in step S64 of FIG. 8 as described later. Note that the main control unit 117 may judge whether the communication unit 116 receives information indicating an estimation that the unmanned aerial vehicle 11 is flying within the predetermined range. If the communication unit 116 receives the estimation result, the process proceeds to step S9. If the communication unit 116 does not receive the estimation result, the process proceeds to step S5.

(Step S9)

The flight control unit 112 controls the flight unit 111 to perform a flight control corresponding to a case where the server 13 estimates that the unmanned aerial vehicle 11 is not flying within the predetermined range (or the vehicle is flying out of the predetermined flight). Details will be described later mainly in a third embodiment. Upon completion of the process of step S9, the process proceeds to step S5.

(Step S10)

The main control unit 117 controls the communication unit 116 to transmit, to the server 13, information indicating that the power of the unmanned aerial vehicle 11 will be turned off. Upon completion of the process of step S10, the process proceeds to step S11. Note that the process of step S10 is not indispensable. The process may proceed to step S11 without transmitting, to the server 13, the information indicating that the power of the unmanned aerial vehicle 11 will be turned off.

(Step S11)

The main control unit 117 turns off the power of the unmanned aerial vehicle 11.

(Control of Server 13)

Figure 7:
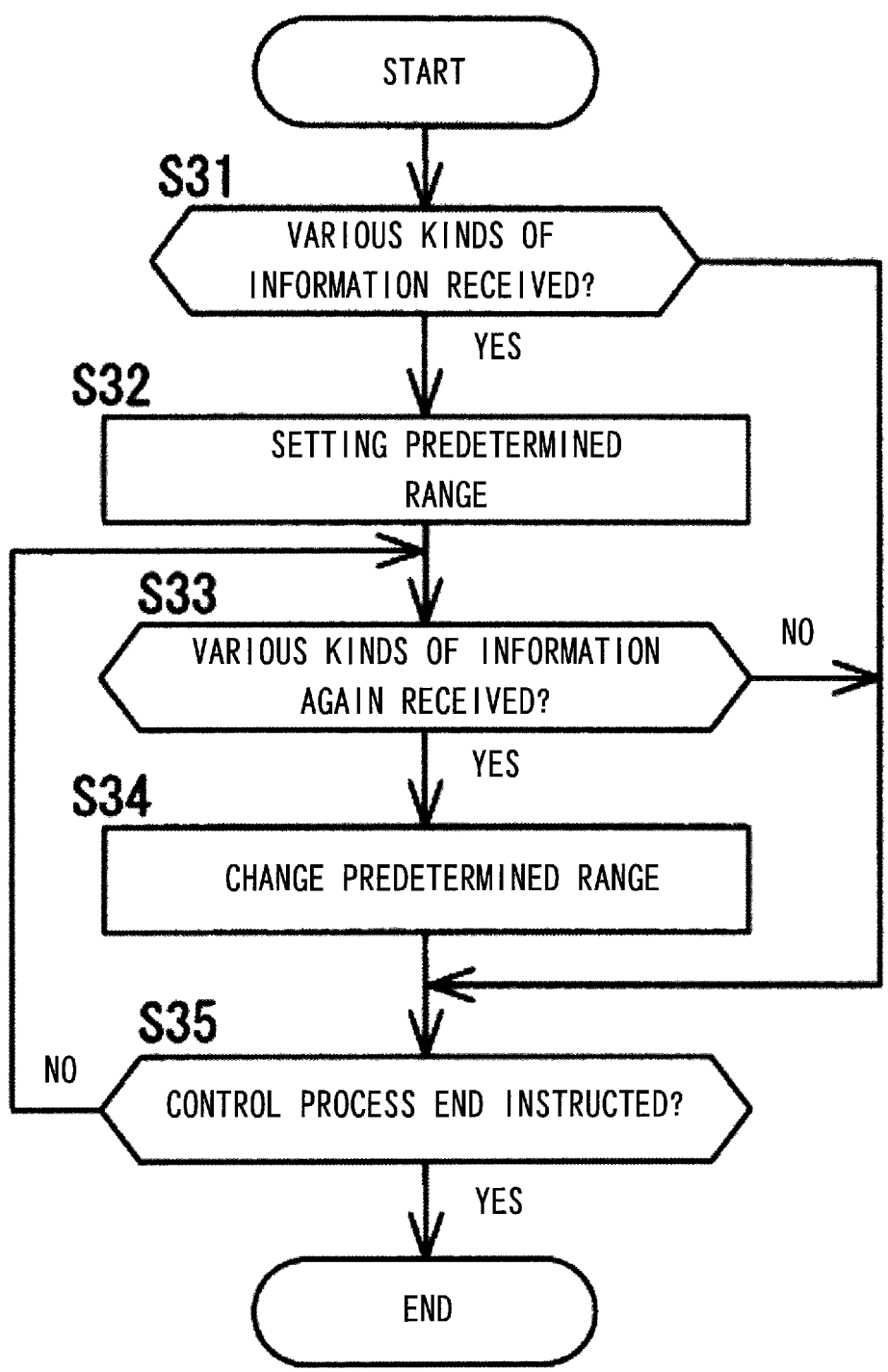
FIG. 7 is a flowchart relating to a setting of a predetermined range in which the unmanned aerial vehicle is permitted to fly.
Figure 8:
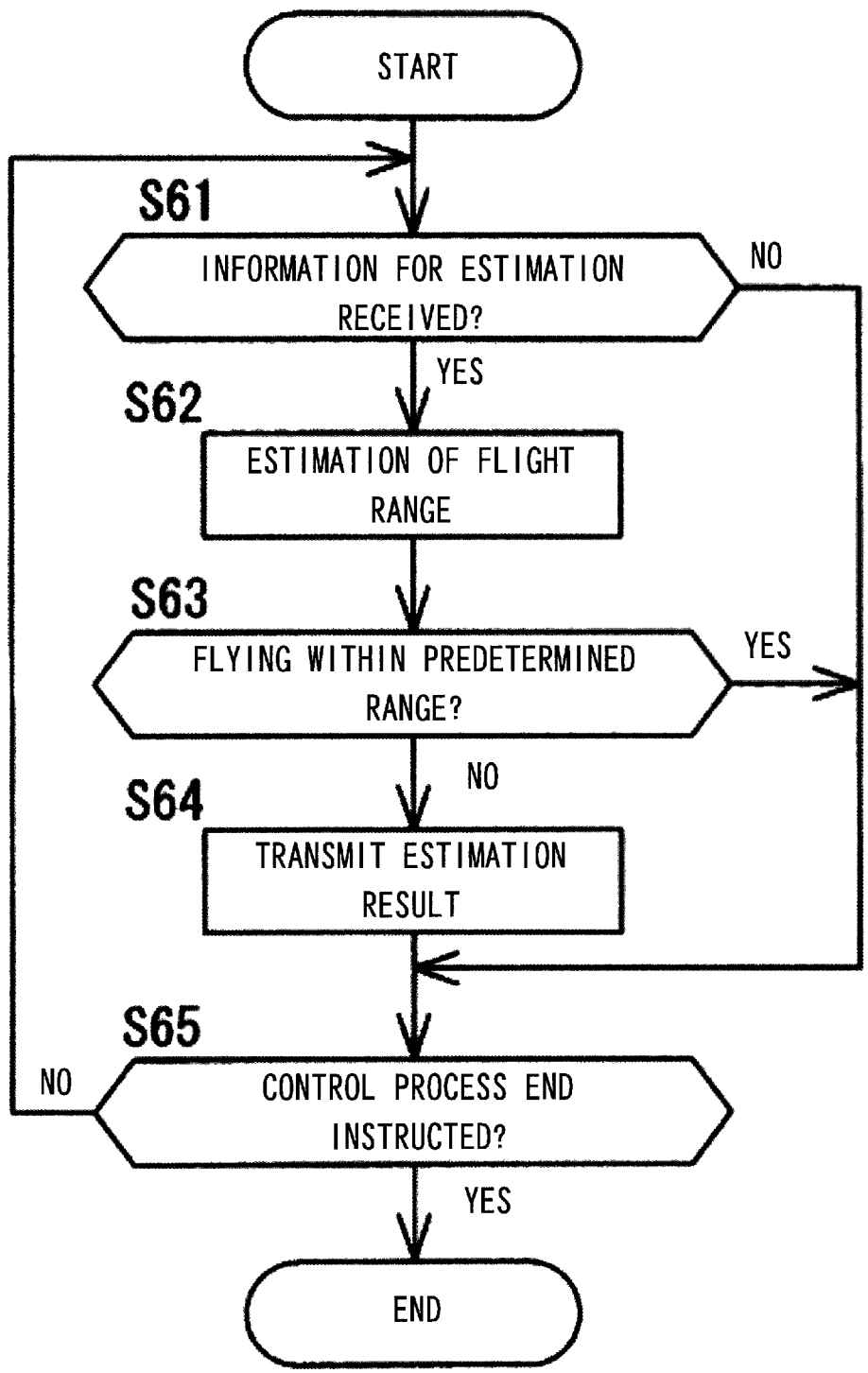
FIG. 8 is a flowchart relating to a process of estimating whether or not the unmanned aerial vehicle is flying within the predetermined range.

FIGS. 7 and 8 each show an example of a flowchart illustrating a control process of the server 13. First, referring to FIG. 7, a process of setting a predetermined range in which the unmanned aerial vehicle 11 is permitted to fly will be described.

(Step S31)

The control unit 133 judges whether the communication unit 131 has received the various kinds of information transmitted by the unmanned aerial vehicle 11 in step S3 of FIG. 6. At this time, the control unit 133 may control the storage unit 132 to store the various kinds of information received from the unmanned aerial vehicle 11 in the storage unit 132. Note that the various kinds of information are not necessarily stored in the storage unit 132. If the communication unit 131 has received the various kinds of information, the process proceeds to step S32. If the communication unit 131 has not received the various kinds of information, the process proceeds to step S35.

(Step S32)

The setting unit 1331 sets a predetermined range in which the unmanned aerial vehicle 11 is permitted to fly, based on the various kinds of information received in step S31. Details will be described later mainly in a second embodiment. Upon completion of the process of step S32, the process proceeds to step S33.

(Step S33)

The control unit 133 judges whether the communication unit 131 has received various kinds of information from the unmanned aerial vehicle 11 again. If the communication unit 131 has received the various kinds of information again, the process proceeds to step S34. If the communication unit 131 has not received the various kinds of information again, the process proceeds to step S35.

(Step S34)

The setting unit 1331 changes the range set in step S32 based on the various kinds of information newly received by the communication unit 131 in step S33. Upon completion of the process of step S34, the process proceeds to step S35.

(Step S35)

The control unit 133 judges whether the end of the control process is instructed. For example, when the communication unit 131 receives information transmitted by the unmanned aerial vehicle 11 in the step S10 of FIG. 6, indicating that the power will be turned off, the control unit 133 can judge that the end of the control process is instructed. Further, when various kinds of information have not been received for a predetermined time or longer, the control unit 133 may judge that the end of the control process is instructed. If the end of the control process is instructed, the control unit 133 ends the process. If the end of the control process is not instructed, the process proceeds to step S33.

A process of estimating whether the unmanned aerial vehicle 11 is flying within a predetermined range will now be described with reference to FIG. 8.

(Step S61)

The control unit 133 judges whether the communication unit 131 has received the various kinds of information (information for estimation) transmitted from the unmanned aerial vehicle 11 in step S6 of FIG. 6. At this time, the control unit 133 may control the storage unit 132 to store the various kinds of information received from the unmanned aerial vehicle 11 in the storage unit 132. Note that the various kinds of information are not necessarily stored in the storage unit 132. If the communication unit 131 has received the various kinds of information, the process proceeds to step S62. If the communication unit 131 has not received the various kinds of information, the process proceeds to step S65.

(Step S62)

The estimation unit 1332 estimates whether the unmanned aerial vehicle 11 is flying within or out of a predetermined range, based on the various kinds of information (the information for estimation) received in step S61. Details will be described later mainly in the first embodiment. Upon completion of the process of step S62, the process proceeds to step S63.

(Step S63)

If the estimation result of step S62 indicates that the unmanned aerial vehicle 11 is flying within the predetermined range, the process proceeds to step S65. If the estimation result indicates that the unmanned aerial vehicle 11 is not flying within the predetermined range (the vehicle is flying out of the predetermined range), the process proceeds to step S64.

(Step S64)

The control unit 133 controls the communication unit 131 to transmit, to the unmanned aerial vehicle 11, information indicating an estimation result that the unmanned aerial vehicle 11 is not flying within the predetermined range (the vehicle 11 is flying out of the predetermined range). The communication unit 131 may transmit, to the unmanned aerial vehicle 11, information indicating an estimation that the unmanned aerial vehicle 11 is flying within the predetermined range. The communication unit 131 may be able to transmit, to the unmanned aerial vehicle 11, both types of the information indicating an estimation result that the unmanned aerial vehicle is flying out of the predetermined range and the information indicating an estimation result that the unmanned aerial vehicle is flying within the predetermined range. By receiving these types of information, the unmanned aerial vehicle 11 can understand whether the own vehicle is flying within or out of the predetermined range. Additionally, a special flight control can be executed when the unmanned aerial vehicle 11 is flying out of the predetermined range. This will be described later. Upon completion of the process of step S64, the process proceeds to step S65.

(Step S65)

The control unit 133 judges whether the end of the control process is instructed. For example, when the communication unit 131 receives the information, transmitted by the unmanned aerial vehicle 11 in step S10 of FIG. 6, indicating that the power will be turned off, the control unit 133 can judge that the end of the control process is instructed. Further, when the information for estimation has not been received for a predetermined time or longer, the control unit 133 may judge that the end of the control process is instructed. If the end of the control process is instructed, the control unit 133 ends the process. If the end of the control process is not instructed, the process proceeds to step S61.

First Embodiment

First, an estimation as to whether the unmanned aerial vehicle 11 is flying within or out of a predetermined range will be described in detail with reference to FIGS. 8, 9.

As described above, the predetermined range may be, for example, a range in which the operator can monitor (check, visually recognize, visually observe) the unmanned aerial vehicle 11. Possible situations where the operator cannot monitor (check, visually recognize, visually observe) the unmanned aerial vehicle 11 include the following situations:

(a) the operator cannot check the unmanned aerial vehicle 11 because the unmanned aerial vehicle 11 and the operator are too far apart;

(b) the operator cannot check the unmanned aerial vehicle 11 because there is an obstacle between the the unmanned aerial vehicle 11 and the operator;

(c) the operator looked aside from the unmanned aerial vehicle 11 or lost sight of the unmanned aerial vehicle 11;

(d) another unmanned aerial vehicle is flying around the unmanned aerial vehicle 11 and the operator cannot identify the target unmanned aerial vehicle 11; and (e) background conditions around the unmanned aerial vehicle 11 makes it difficult to visually observe the unmanned aerial vehicle 11.

In a situation where the operator cannot monitor (check, visually recognize, visually observe) the unmanned aerial vehicle 11 as described above, the unmanned aerial vehicle 11 performs an action or avoidance control by which such a situation is resolved. Such an action or avoidance control will be described in detail mainly in the third embodiment. In the present embodiment, methods of estimating whether the operator cannot monitor (check, visually recognize, visually observe) the unmanned aerial vehicle 11 will be described. Although a plurality of types of estimation methods will be described below, any one of them may be executed alone or several estimation methods may be combined.

(1-1: Authentication of Operator)

Figure 9:
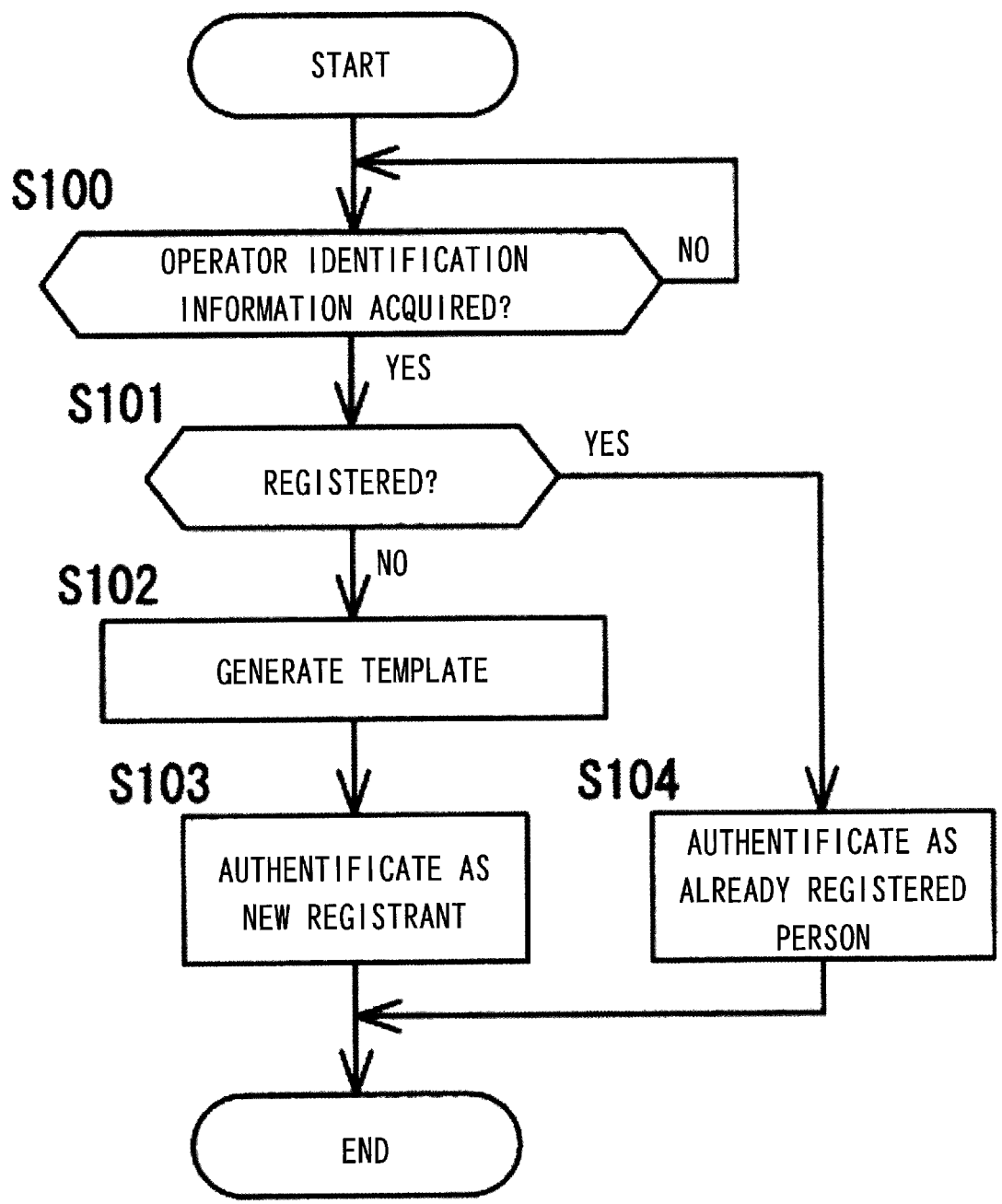
FIG. 9 is a flowchart relating to an authentication process of identifying an operator.

First, the server 13 performs an authentication process of identifying an operator as illustrated in FIG. 9. In the present embodiment, the server 13 is provided with an estimation unit 1332, which continuously estimates whether or not the unmanned aerial vehicle 11 is flying within the predetermined range. The server 13 estimates whether the operator can check the unmanned aerial vehicle 11, whether the operator can visually observe the unmanned aerial vehicle 11, or the like. In other words, the server 13 estimates whether or not a viewing direction of the operator is the direction of the unmanned aerial vehicle 11, whether or not the operator can view the unmanned aerial vehicle 11, and the like. Such an estimation is made for the operator of the unmanned aerial vehicle 11. Therefore, the server 13 performs an authentication process of identifying the operator of the unmanned aerial vehicle 11. After the unmanned aerial vehicle 11 starts flying, the server 13 estimates whether the operator identified by the authentication process can currently check or visually recognize the unmanned aerial vehicle 11. As described above, the "operator" as used here includes a user using the unmanned aerial vehicle 11. The operator includes a user of an unmanned aerial vehicle 11 in a case where the unmanned aerial vehicle 11 automatically and autonomously flies so that the user does not need to maneuver the vehicle.

Any of various authentication processes of identifying the operator may be used, including an authentication based on physical features of the operator (e.g., facial authentication and fingerprint authentication), ID authentication, and the like.

(Step S100)

The control unit 133 judges whether the communication unit 131 has acquired information required for identifying the operator. The information may be acquired from the unmanned aerial vehicle 11 as illustrated in steps S2 and S3 of FIG. 6. Further, the information may be acquired from the remote controller 12, other mobile devices, or the like.

Information required for identifying the operator depends on the authentication method. For example, for the facial authentication, facial feature information may be required such as a head shot of the operator. For the fingerprint authentication, fingerprint information of the operator may be required. For the ID authentication, ID information of the operator or the like may be required. The details of the authentication for each kind of information will be described later.

(Step S101)

The control unit 133 judges whether or not a template or the like corresponding to the information (e.g., facial feature information, fingerprint information, ID information) received in step S100 has already been registered in the storage unit 132. The "template" as used here means information required for allowing the image-capturing unit 113*a* to track the operator. The server 13 transmits the template to the unmanned aerial vehicle 11, and the image-capturing control unit 114 causes the image-capturing unit 113*a* to track the operator based on the received template. Further, the flight control unit 112 may control the flight unit 111 so that the image-capturing unit 113*a* can photograph the operator. Note that the server 13 may generate a control signal for tracking the operator based on the template and transmit the generated control signal to the unmanned aerial vehicle 11. The unmanned aerial vehicle 11 can control the image-capturing unit 113*a* or the flight unit 111 to track the operator, based on the received control signal. The following description explains the template as an example, but the information is not limited to the template. Any type of information allowing the image-capturing unit or the flight unit to track the operator may be used, including facial feature information of the operator or feature information of clothes of the operator, or the like. If there is no template and the like, the process proceeds to step S102. If there is a template, the process proceeds to step S104.

(Step S102)

Based on the information received in step S100, a template is generated. The generated template is registered in the storage unit 132. Note that the template is not necessarily stored in the storage unit 132. Upon completion of the process of step S102, the process proceeds to step S103.

(Step S103)

The operator is authenticated as a new registrant, and the authentication process ends.

(Step S104)

On the other hand, when the process proceeds from step S101 to step S104, a registrant indicated by the corresponding template is authenticated as a current operator, and the authentication process ends.

An authentication method for each kind of information will now be described.

(1-1A: Facial Authentication)

For the facial authentication, the face of the operator has to be photographed. For example, image information is acquired by photographing the face of the operator with the image-capturing unit 113*a* of the unmanned aerial vehicle 11, a camera mounted on the remote controller 12, or a camera of a mobile device (e.g., mobile phone) held by the operator, and the image information is transmitted to the server 13. A method of photographing an operator with the image-capturing unit 113*a* of the unmanned aerial vehicle 11 may include moving the unmanned aerial vehicle 11 near the position of the remote control 12 based on GPS positional information of the remote controller 12 and then capturing an image including the face of the operator holding the remote control 12 in his/her hand. Alternatively, the unmanned aerial vehicle 11 may rise and hover at a position where the face of the operator can be photographed, and capture an image including the face of the operator. The face of the operator may be photographed without causing the unmanned aerial vehicle 11 to rise. In such a case, an indication of an authentication process being in progress may be displayed on the display unit 121 of the remote controller 12. The server 13 receives such image information (step S100 of FIG. 9). In the case of a new registrant, the transmitted image information is stored in the storage unit 132 as a template, which is to be used to track the operator. Alternatively, a template is generated based on the image information (step S102 of FIG. 9). In the case of an already registered person, the transmitted image information is used to extract the corresponding template from the storage unit 132. The template includes facial features for authenticating the face of the operator, characteristics of clothes that the operator wears, and the like.

Additionally, templates of a plurality of operators may be stored in the storage unit 132. The control unit 133 of the server 13 compares the feature information of the face of an operator M included in the image information received from the unmanned aerial vehicle 11, the remote controller 12, or the like, with the feature information of the faces included in the templates already registered in the storage unit 132. Thus, the control unit 133 can judge whether the operator M is an already registered person or a new registrant. If the operator M is judged as an already registered person, the control signal for the unmanned aerial vehicle 11 is generated based on the template of the registered operator M, and the generated control signal is transmitted to the unmanned aerial vehicle 11. The unmanned aerial vehicle 11 can control the image-capturing unit 113*a* or the flight unit 111 to track the operator M, based on the received control signal. Note that the template of the registered operator M may be transmitted to the unmanned aerial vehicle 11. The unmanned aerial vehicle 11 can track the operator M based on the received template.

On the other hand, if the operator M is judged as a new registrant, features of the face or characteristics of the cloths are registered as a template of the operator M based on the image information. Further, the photographed person is identified as the operator operating the remote controller 12. As described above, the server 13 transmits the registered template or the control signal generated based on the template to the unmanned aerial vehicle 11. The unmanned aerial vehicle 11 can track the operator M based on the received template or the control signal.

(1-1B: Fingerprint Authentication)

Next, the fingerprint authentication will be described by way of example. When the unmanned aerial vehicle 11 or the remote controller 12 is provided with a sensor for fingerprint authentication, the operator can be identified by fingerprint authentication. The fingerprint information of the operator may be registered in the storage unit 132 in association with the template of the registered operator. The operator M allows the fingerprint authentication sensor of the unmanned aerial vehicle 11 or the remote controller 12 to read his/her fingerprint. The server 13 acquires fingerprint information read from the unmanned aerial vehicle 11 or the remote controller 12 (step S100 of FIG. 9). The server 132 compares the acquired fingerprint information with the fingerprint information registered in the storage unit 132. As a result of the comparison, when the acquired fingerprint information matches one of the registered fingerprint information pieces, the operator who is associated with the matched fingerprint information piece is identified as the operator M (Step S104 of FIG. 9).

In the case of a new registration or no matched fingerprint information, the fingerprint information read by the fingerprint authentication sensor of the remote controller 12 may be registered in the storage unit 132. In this case, as in the facial authentication described above, the feature information of the face or the feature information of the clothes of the operator M may be acquired and stored in the storage unit 132 in association with the fingerprint information of the operator M. In this way, when the operator M goes through the next authentication process, the server 13 can authenticate the operator M as an already registered person.

(1-1C: ID Authentication)

Next, the ID authentication will be described. The operator inputs his/her own ID information via an input unit (not illustrated) of the unmanned aerial vehicle 11 or an input unit (not illustrated) of the remote controller 12. The server 13 receives the input ID information (step S100 of FIG. 9). IDs of a plurality of operators are registered in the server 13. Further, templates indicating characteristics (e.g., facial features) of operators are registered in association with the IDs. The server 13 compares the received ID information with the already registered ID information pieces and identifies an operator indicated by a template associated with the matched ID information piece as the operator operating the remote controller 12. In the case of no matched ID being registered or no template being associated with a matched ID, an image of the operator may be acquired by the image-capturing unit 113a of the unmanned aerial vehicle 11, the image-capturing unit of the remote controller 12, or the like to generate a template, as described above.

Further, a storage medium having the ID information stored therein may be attached to the remote controller 12 to recognize the operator. In this case, not only the ID information, but also the characteristics of the operator (e.g., visual acuity, sex, height, experience of maneuvering the unmanned aerial vehicle) may also be stored in the storage medium and read into the server 13.

(1-2: Estimation as to Whether Unmanned Aerial Vehicle is Within or Out of Predetermined Range)

A method of acquiring the information for estimation in step S61 illustrated in FIG. 8 and a method of estimating whether the unmanned aerial vehicle is flying within the predetermined range in step S62 will now be described in detail.

In step S61 of FIG. 8, the control unit 133 judges whether the communication unit 131 has received information (information for flight estimation) required for estimating whether the unmanned aerial vehicle 11 is flying within a predetermined range. The information may be acquired from the unmanned aerial vehicle 11 as illustrated in step S6 of FIG. 6. Alternatively, the information may be acquired from the remote controller 12.

The information required for estimating whether or not the unmanned aerial vehicle 11 is flying within a predetermined range varies depending on the estimation method. For example, in a case of estimating based on images, image information may be required. Hereinafter, an estimation method will be described for each of various kinds of information for flight estimation.

(1-2A: Estimation Based on Images)

First, a method of estimating whether the unmanned aerial vehicle 11 is flying within a predetermined range based on images will be described.

The unmanned aerial vehicle 11 tracks and photographs the operator with the image-capturing unit 113a. The image information captured here is information required for estimating whether the unmanned aerial vehicle 11 is flying within the predetermined range. The unmanned aerial vehicle 11 transmits the image information to the server 13. The server 13 estimates whether the unmanned aerial vehicle 11 is flying within the predetermined range based on the size of the face of the operator in the received image. For example, when the size of the face of the operator (or a proportion of the face of the operator occupying in the image) is lower than a predetermined threshold (hereinafter referred to as a face proportion threshold), the server 13 estimates that the unmanned aerial vehicle 11 is flying out of the predetermined range. This is because the operator possibly cannot currently visually recognize the unmanned aerial vehicle 11 due to the unmanned aerial vehicle 11 being away from the operator. The size of the face of the operator included in the image (the proportion of the face of the operator occupying in the image) may be calculated in consideration of image-capturing conditions, such as a zoom magnification of the image-capturing unit 113a. When it is estimated that the unmanned aerial vehicle is flying out of the predetermined range as described above, the flight control unit 112 of the unmanned aerial vehicle 11 may control the flight unit 111 to fly in a direction toward the operator. Details will be described mainly in the third embodiment.

Note that on the occurrence of fog, for example, the operator may visually recognize the unmanned aerial vehicle 11 with a greater difficulty, given a distance between the unmanned aerial vehicle 11 and the operator. When such a situation change occurs, the threshold may be changed according to the situation as described later. Such a threshold is stored in the storage unit 132 of the server 13. A threshold setting method will be described later.

Further, when the face of the operator can no longer be detected in the image, e.g., when the template matching fails because the face of the operator is no longer included in the image, the server 13 may also estimate that the unmanned aerial vehicle 11 is flying out of the predetermined range. This is also the case when the eyes of the operator are not included in the image.

Additionally, when another object is superimposed on the face of the operator in the image, the server 13 may also estimate that the unmanned aerial vehicle 11 is flying out of the predetermined range. Such a case includes, for example, a case where another object is superimposed on the entire face of the operator in the image or a case where another object covers the eye part of the operator.

Further, when an amount of motion of the face of the operator in the image is larger than a predetermined threshold (hereinafter referred to as a motion amount threshold), the server 13 estimates that the unmanned aerial vehicle 11 is flying out of the predetermined range. This is because the operator may have lost sight of the unmanned aerial vehicle 11 and be looking for it in a case of a large motion of the face of the operator. The motion amount of the face of the operator in the image can be calculated by comparing images captured at different points in time. When it is estimated that the unmanned aerial vehicle is flying out of the predetermined range as described above, the flight control unit 112 of the unmanned aerial vehicle 11 may control the flight unit 111 to fly in a direction toward the operator. Details will be described mainly in the third embodiment.

Note that the tracking of the operator may be performed by matching the face in the image captured by the image-capturing unit 113*a* against the templates. Further, the server 13 may control the image-capturing unit 113*a* to face to the operator based on the GPS positional information of the remote controller 12.

(1-2B: Estimation Based on Positional Relationship Between Unmanned Aerial Vehicle and Operator)

Next, a method of estimating whether the unmanned aerial vehicle 11 is flying within the predetermined range based on a positional relationship between the unmanned aerial vehicle 11 and the operator will be described.

For example, a distance between the unmanned aerial vehicle 11 and the operator is calculated. When the calculated distance is larger than a predetermined threshold (hereinafter referred to as a distance threshold), it can be estimated that the unmanned aerial vehicle is flying out of the predetermined range. A method of calculating a distance may include measuring a distance by a distance meter mounted on the unmanned aerial vehicle 11.

As the obstacle detection unit 118 illustrated in FIG. 1, a distance meter such as a laser type rangefinder or a distance meter using millimeter waves may be mounted on the unmanned aerial vehicle 11. A method of measuring a distance may include orienting the distance meter toward the operator based on GPS positional information of the unmanned aerial vehicle 11 and the operator, and measuring a distance to the operator by a distance meter. For example, the distance meter may be attached to the gimbal 42 on which the image-capturing unit 113*a* is mounted. In this case, the distance meter may be provided in the vicinity of the optical axis of the image-capturing unit 113*a* and arranged so that the optical axis of the distance meter is parallel to the optical axis of the image-capturing unit 113*a*. Such an arrangement allows the distance meter to automatically face to the operator when the image-capturing unit 113*a* tracks the face of the operator.

Another example of the method of calculating a distance may include measuring a distance by a distance measurement function of the image-capturing unit 113*a* mounted on the unmanned aerial vehicle 11. In a case where a distance measuring function (e.g., a phase-type range sensor) is provided in the image-capturing unit 113*a*, a distance to the face may be measured through the distance measuring function of the image-capturing unit 113*a* while the image-capturing unit 113*a* tracks the face of the operator. Then, by comparing the distance measurement result with the distance threshold, it is possible to estimate whether the unmanned aerial vehicle 11 is flying within a predetermined range.

A further example of the method of calculating a distance may include measuring a distance based on the GPS positional information. The server 13 can acquire the GPS positional information of the unmanned aerial vehicle 11 and the remote controller 12 via the communication network 14 and calculate a distance between the unmanned aerial vehicle 11 and the remote controller 12 based on their positions (three-dimensional positions). The server 13 can then estimate whether the unmanned aerial vehicle 11 is flying within a predetermined range by comparing the calculated distance with the distance threshold.

An obstacle between the unmanned aerial vehicle 11 and the operator may be detected to estimate whether the unmanned aerial vehicle 11 is flying within a predetermined range.

The obstacle can be detected based on a captured image of the image-capturing unit 113*a*. For example, the image-capturing unit 113*a* of the unmanned aerial vehicle 11 tracks and photographs the face of the operator. Alternatively, a direction from the unmanned aerial vehicle 11 to the operator is calculated based on the GPS positional information, and the image-capturing unit 113*a* is turned to the calculated direction to photograph the face of the operator. The facial recognition is impossible when any obstacle is located between the unmanned aerial vehicle 11 and the operator. Thus, the server 13 can estimate that the operator cannot currently visually observe the unmanned aerial vehicle 11 based on the facial recognition becoming impossible. Further, the image-capturing unit 113*b* mounted on the unmanned aerial vehicle 11 may photograph the surroundings of the unmanned aerial vehicle 11 and calculate three-dimensional information from the captured image to judge the presence or absence of the obstacle from the calculated three-dimensional information.

Another method of detecting an obstacle may be a detection of an obstacle based on the distance measurement value and the GPS positional information.

When any obstacle is located between the operator and the unmanned aerial vehicle 11, the distance measurement value measured by the distance meter described above becomes a distance between the unmanned aerial vehicle 11 and the obstacle. Thus, when the distance measurement value is smaller than the distance between the unmanned aerial vehicle 11 and the operator calculated based on the GPS positional information, it can be estimated that there is an obstacle between the operator and the unmanned aerial vehicle 11 and the operator cannot visually observe the unmanned aerial vehicle 11.

A further method of detecting an obstacle may include detecting an obstacle based on a difference between distance measurement values before an intervention of the obstacle between the unmanned aerial vehicle 11 and the operator and during the intervention.

When an obstacle intervenes between the distance meter of the unmanned aerial vehicle 11 and the operator, a value measured by the distance meter changes abruptly and significantly. Therefore, when a difference between a previous distance measurement value and a current distance measurement value, which are sequentially calculated, is equal to or larger than the predetermined threshold, it can be estimated that there is an obstacle between the operator and the unmanned aerial vehicle 11 and the operator cannot visually observe the unmanned aerial vehicle 11.

A further method of detecting an obstacle may include detecting an obstacle with map information and GPS positional information.

The server 13 reads out map information on surroundings of the unmanned aerial vehicle 11 from the storage unit 132 based on GPS positional information of the unmanned aerial vehicle 11, or obtains map information from the Internet via the communication network 14. The estimation unit 1332 of the server 13 can generate map information of buildings around the unmanned aerial vehicle 11 from the map information to judge whether or not an obstacle such as a building is located between the unmanned aerial vehicle 11 and the operator.

A further method of detecting an obstacle may include detecting an obstacle by the obstacle detection unit 118 of the unmanned aerial vehicle 11.

As the obstacle detection unit 118, an obstacle detector using millimeter waves is mounted on the unmanned aerial vehicle 11. A millimeter wave is transmitted from the obstacle detection unit 118 to the operator, so that a wave reflected by the obstacle between the unmanned aerial vehicle 11 and the operator may be received by the obstacle detection unit 118 to determine a distance to the obstacle. When the obtained distance is smaller than the distance (distance calculated from the GPS positional information) between the remote controller 12 and the unmanned aerial vehicle 11, it can be judged that there is an obstacle.

Further, another method of detecting an obstacle may include detecting an obstacle by irradiating light from the operator side toward the unmanned aerial vehicle.

Figure 4:
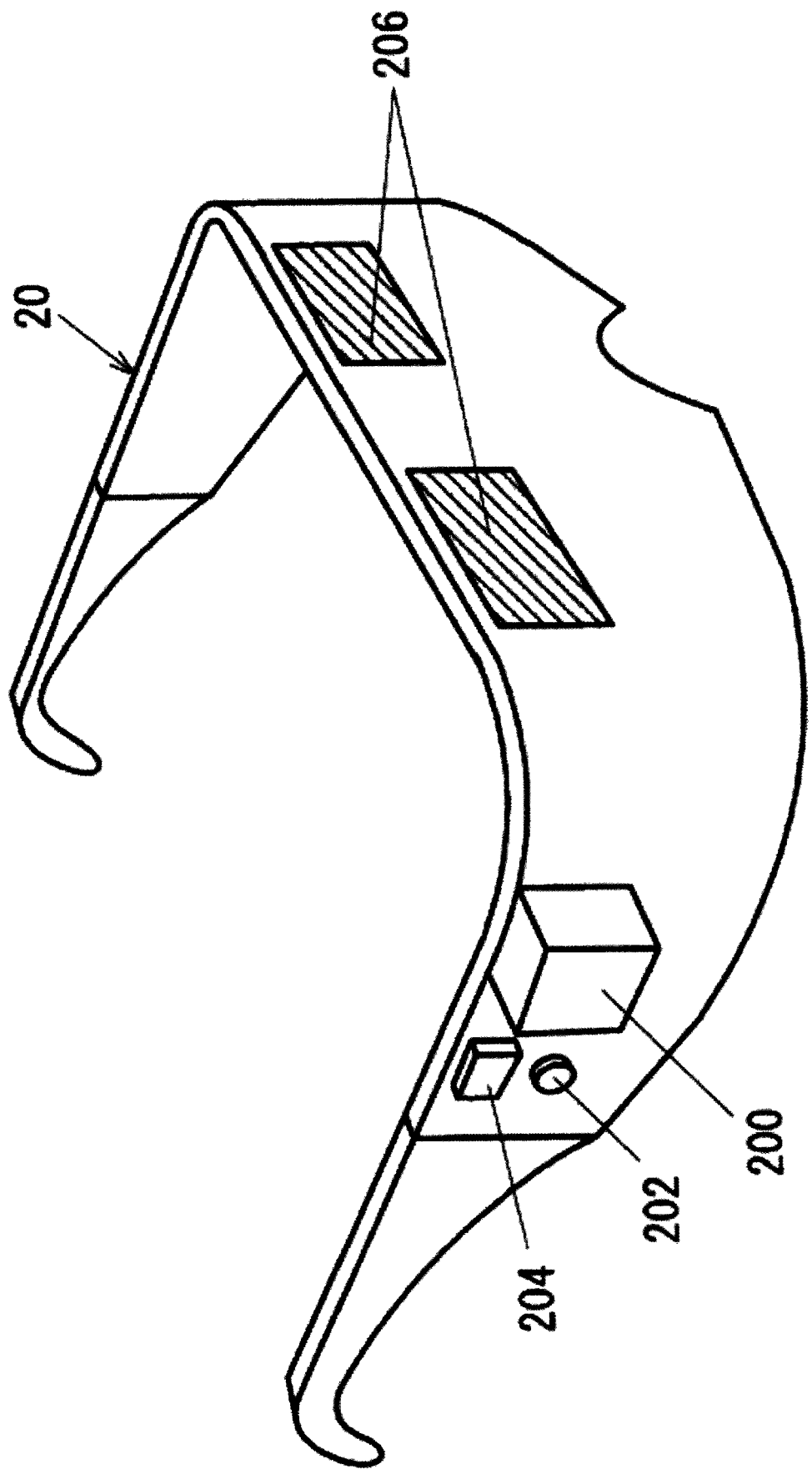
FIG. 4 is a view illustrating an example of a head mounting device.

In this case, the operator wears a head mounting device 20 as illustrated in FIG. 4. For example, the operator wears in advance the head mounting device 20 provided with a light emitting device 200 that emits light (e.g., laser light or infrared light) or a device (e.g., a digital compass) 202 that detects the orientation of the face. A light receiver that receives light from the light emitting device 200 may be provided in the unmanned aerial vehicle 11. Note that the head mounting device 20 may also be provided with a communication device 204.

Azimuth information of the digital compass 202 is transmitted to the server 13 via the communication network 14. The server 13 can judge in which direction the face of the operator orients, based on the azimuth information of the digital compass 202. When the light emitted from the light emitting device 200 is not received by the light receiver provided in the unmanned aerial vehicle 11 and the orientation of the face is within a predetermined angle from the direction of the unmanned aerial vehicle 11, that is, when the light is not received despite the face directing to the unmanned aerial vehicle 11, it can be estimated that there is an obstacle and the operator cannot currently visually recognize the unmanned aerial vehicle 11. Note that the light from the light emitting device 200 is not received by the light receiver also when the orientation of the face is largely different from the direction of the unmanned aerial vehicle 11; however, in this case, regardless of the presence or absence of an obstacle, it may be estimated that the operator cannot currently visually recognize the unmanned aerial vehicle 11 because the line-of-sight is largely offset from the direction of the unmanned aerial vehicle 11. In this case, the flight control unit 112 may control the flight unit 111 to fly so that the direction of the line-of-sight of the operator and the direction from the operator to the unmanned aerial vehicle 11 coincide.

(1-2C: Estimation by Detecting that Operator Lost Sight of Unmanned Aerial Vehicle)

Next, a method of estimating whether the unmanned aerial vehicle 11 is flying within the predetermined range by detecting that the operator lost sight of the unmanned aerial vehicle 11 will be described.

Situations where the operator loses sight of the unmanned aerial vehicle 11 include a situation where similar unmanned aerial vehicles are flying and the operator cannot distinguish his/her own unmanned aerial vehicle 11 from others, or a situation where the color of the unmanned aerial vehicle 11 is similar to its background color so that the operator loses sight of the unmanned aerial vehicle despite a distance at which the operator can otherwise visually observe the vehicle. Such situations include also a situation in which the operator is spoken to by a third party and looked aside from the unmanned aerial vehicle 11. Methods of detecting that the operator has lost sight of the unmanned aerial vehicle 11 will now be described.

First, one of such methods may include detecting that the operator has lost sight of the unmanned aerial vehicle 11 by an azimuth detector detecting an orientation of the face of the operator.

For example, the operator wears the head mounting apparatus 20 provided with the digital compass 202 as illustrated in FIG. 4. The detection result of the digital compass 202 is transmitted to the server 13 via the communication network 14. The server 13 judges in which direction the face of the operator orients, based on the azimuth information of the digital compass 202.

The estimation unit 1332 of the server 13 calculates in which direction the unmanned aerial vehicle 11 is located as viewed from the operator, based on the GPS positional information of the remote controller 12 and the unmanned aerial vehicle 11. When the calculated direction is different from the face orientation detected by the digital compass 202, it can be judged that the operator lost sight of the unmanned aerial vehicle 11. In a method of judging whether or not the directions are different, for example, it is judged that the operator lost sight of the unmanned aerial vehicle when an angle formed by the direction to the unmanned aerial vehicle 11 and the face orientation is larger than a predetermined threshold (hereinafter referred to as an angle threshold). In this way, when it is judged that the operator lost sight of the unmanned aerial vehicle 11, the server 13 can estimate that the operator cannot currently visually recognize the unmanned aerial vehicle 11 (the unmanned aerial vehicle 11 is not flying within a predetermined range).

Note that, as illustrated in FIG. 4, the head mounting device 20 may further be provided with a line-of-sight direction detecting device 206 so that it may be judged whether or not the operator lost sight of the unmanned aerial vehicle 11, also in consideration of the line-of-sight direction of the operator in addition to the orientation of the face. In this case, the line-of-sight direction detecting device 206 detects the line-of-sight direction of the operator, that is, an angle of the line-of-sight direction with respect to the front direction of the head mounted device 20. Based on the line-of-sight direction and the direction to the unmanned aerial vehicle 11, it can be judged that the operator lost sight of the unmanned aerial vehicle 11 when an angle formed between the direction of the line-of-sight of the operator and the direction to the unmanned aerial vehicle 11 is larger than the angle threshold, which leads to an estimation that the operator does not visually recognize the unmanned aerial vehicle 11. Such an additional consideration of the line-of-sight direction can make the estimation more accurate.

Alternatively, the orientation of the face of the operator may be detected from the image data to estimate whether the operator visually recognize the unmanned aerial vehicle 11.

Features such as eyes, nose, mouth, and ears are extracted from the image captured by the image-capturing unit 113a of the unmanned aerial vehicle 11 to judge whether the face of the operator orients to the traverse direction or the backward direction with respect to the image-capturing unit 113a of the unmanned aerial vehicle 11. Note that, when an image-capturing unit such as a camera is provided in the remote controller 12, the image-capturing unit provided in the remote controller 12 may be used instead of using the image-capturing unit 113*a*. In this case, in order to properly capture the face image of the operator, for example, a display screen instructing to hold the remote controller 12 at a position where the image-capturing unit directly orients toward the face may be displayed on the display unit 121. Alternatively, it is conceivable to notify the operator of how to hold the remote controller 12 by voice guidance. When the server 13 recognizes from the captured image that the face of the operator orients to the transverse direction or the backward direction with respect to the unmanned aerial vehicle 11, the server 13 may estimate that the operator does not visually recognize the unmanned aerial vehicle 11.

Further, the server 13 judges that the operator lost sight of the unmanned aerial vehicle 11 based on wobble of the line-of-sight or the face (head).

As illustrated in FIG. 4, the line-of-sight direction detecting device 206 and the digital compass 202 are provided in the head mounting device 20 to detect the orientation of the line-of-sight and the orientation of the face. Then, when the detected swing angle of the line-of-sight or swing angle of the face (head) wiggles or shakes beyond the angle threshold, it may be regarded that the operator lost sight of the unmanned aerial vehicle 11 and is searching for it. Additionally, when the detected swing amount of the line-of-sight or the detected swing amount of the face (head) is larger than the motion amount threshold described above, it may be judged that the operator lost sight of the unmanned aerial vehicle 11. Alternatively, an acceleration sensor may be provided in the head mounting device 20 to detect the motion of the face, and it may be judged based on the swing angle or the motion amount that the operator has lost sight of the unmanned aerial vehicle 11 and is searching for it. In such a case, it can be estimated that the operator cannot currently visually recognize the unmanned aerial vehicle 11.

Furthermore, a camera may be provided in the head mounting device 20. When a scene photographed by the camera unsteadily swings by a predetermined amount or more, it may be judged that the operator lost sight of the unmanned aerial vehicle 11. Further, when it is detected by image processing that the face of the operator photographed by the image-capturing unit 113*a* of the unmanned aerial vehicle 11 shakes by a predetermined extent or more, it is judged that the operator has lost sight of the unmanned aerial vehicle 11.

(1-2D: Estimation Based on Information Provided by Operator)

Next, a method of estimating whether the operator currently visually recognize the unmanned aerial vehicle 11 based on information provided by the operator will be described.

Figure 2:
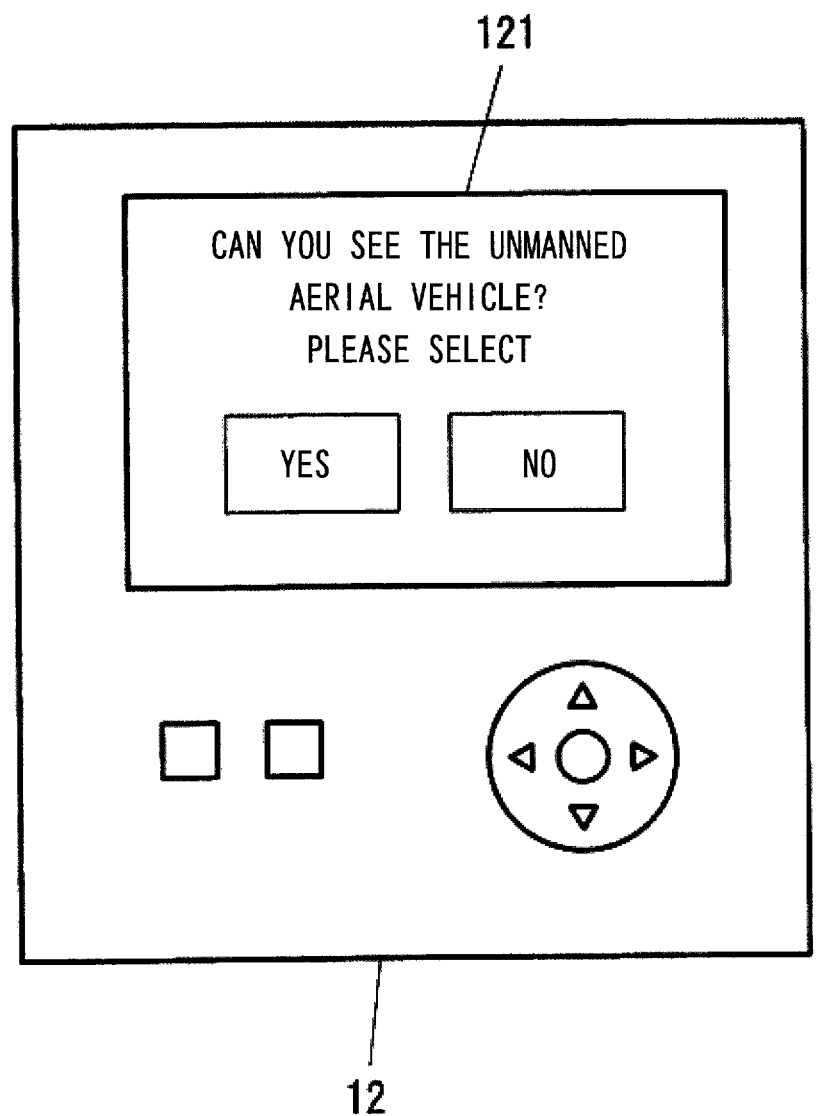
FIG. 2 is a diagram illustrating an example of a display screen displayed on a display unit of a remote controller.

The display unit 121 of the remote controller 12 displays a display screen prompting information input as illustrated in FIG. 2, for example. Note that a sound may be generated to make the operator aware of the display. Viewing the display unit 121, the operator can operate the remote controller 12 to make an answer. Here, if the operator answers "NO" or there is no answer, the server 13 can estimate that the operator cannot currently visually recognize the unmanned aerial vehicle 11. Note that, instead of the remote controller 12, the display screen as illustrated in FIG. 2 may be displayed on the display unit of the mobile device of the operator to prompt the operator to make an answer.

Note that, as another display example, a surrounding map of the unmanned aerial vehicle 11 may be displayed on the display unit 121 to prompt the operator to touch the position of the unmanned aerial vehicle 11 on the map. Then, when the touch position is separated from the actual position by a predetermined distance or more, it may be estimated that the operator cannot currently visually recognize the unmanned aerial vehicle 11. Alternatively, a digital compass may be provided in the remote controller 12 and the display unit 121 may display "Please orient the remote controller toward the unmanned aerial vehicle". In response to the display, if a direction detected by the digital compass of the remote controller 12 is offset from the actual direction calculated from the GPS positional information by a predetermined angle or more, it can be estimated that the operator cannot currently visually recognize the unmanned aerial vehicle 11.

Furthermore, when the operator operates the mobile device to make a conversation, a mail operation, or the like, it may be estimated that the operator cannot currently visually recognize the unmanned aerial vehicle 11. Such a situation can be judged from an image captured by the image-capturing unit 113*a* of the unmanned aerial vehicle 11. The server 13 may directly acquire the information from the mobile device that the operator makes a conversation, a mail operation, or the like.

By performing the process as described above, it can be estimated whether the unmanned aerial vehicle 11 is flying within or out of a predetermined range. The predetermined range may be, for example, a range in which the operator can monitor (check, visually recognize, visually observe) the unmanned aerial vehicle 11, or a range in which the operator does not lose sight of the vehicle. Such a range may be, for example, a range in the front direction of the operator, a range within a predetermined angle from the line-of-vision or line-of-sight direction of the operator, or a range that does not include an area behind the operator. Further, an area shielded by the obstacle from the operator may not be included in the predetermined range. As a result, the operator can allow the unmanned aerial vehicle 11 to fly in a range in which he/she can visually observe the vehicle, which ensures the safety of the flight.

Second Embodiment

Next, a setting of the predetermined range in which the unmanned aerial vehicle 11 is permitted to fly will be described with reference to FIG. 7. Here, mainly, a process of acquiring information in step S31, a process of setting a predetermined range in step S32, and a process of changing a predetermined range in step S34 will be described in detail.

The "predetermined range" as used here may be, for example, a range in which it is estimated that the operator is monitoring (checking, visually recognizing, visually observing) the unmanned aerial vehicle 11, a range in which it is estimated that the operator is not losing sight of the unmanned aerial vehicle 11, or a range in which the unmanned aerial vehicle 11 accepts operations from the operator. Such a range may be, for example, a range in the front direction of the operator, a range within a predetermined angle from the line-of-vision or line-of-sight direction of the operator, or a range that does not include an area behind the operator. Further, an area shielded by the obstacle from the operator may not be included in the predetermined range.

Such a predetermined range depends on the visual recognition ability of the operator and flight conditions in which the unmanned aerial vehicle 11 is flying. The predetermined range may be preset at the time of product shipment or the like. Such a range is hereinafter referred to as an initial range. The initial range may be a range that is set on the assumption of the average visual recognition ability of a large number of operators and a predetermined flight environment (for example, suburbs during the daytime in fair weather).

(2-1: Acquisition of Information)

First, a process of acquiring information in step S31 of FIG. 7 will be described. In step S31, the control unit 133 judges whether the communication unit 131 has acquired information required for setting a predetermined range. The information required for setting the predetermined range includes, for example, information on characteristics of the operator (e.g., visual acuity, sex, height, experience of maneuvering the unmanned aerial vehicle 11), information on surrounding flight conditions of the unmanned aerial vehicle (place, view, the number of persons, surrounding objects and the like), information on weather, information input by the operator to the remote controller 12 and to the mobile device held in a hand of the operator.

When an operator flies the unmanned aerial vehicle 11, it is conceivable that a proper predetermined range varies depending on the operator and flight conditions. It is therefore conceivable that an appropriate range is set based on the current flight conditions and the visual recognition ability of the operator, and the unmanned aerial vehicle 11 flies within the set range. The initial range may, of course, be used as it is without alteration. When the initial range is not preset at the time of product shipment or the like, the flight range may be set based on flight conditions and the visual recognition ability of the operator. As described above, the server 13 acquires information required for setting a predetermined range from another device (step S2 and step S3 of FIG. 6, step S31 of FIG. 7).

When information required for setting a predetermined range is stored in the storage unit 132 of the server 13, the information stored in the storage unit 132 may be used without acquiring from another device. When the information for setting a predetermined range is not stored in the storage unit 132, the information may be acquired from the unmanned aerial vehicle 11 or the remote controller 12. The information may be acquired from the Internet via the communication network 14.

(2-1A: Information on Characteristics of Operator)

First, a process of acquiring information on characteristics of the operator will be described.

For example, in acquiring visual acuity data, which is a characteristic of the operator, data may be acquired from the storage unit 132 when the visual acuity data of the operator is stored in advance in the storage unit 132. Further, the operator may be prompted to input by using an input unit (not illustrated) provided in the unmanned aerial vehicle 11 or an input unit (not illustrated) provided in the remote controller 12. When there is a storage medium that stores visual acuity data in advance, the data may be acquired from the storage medium. A visual acuity test mark may be displayed on the display unit 121 of the remote controller 12 and the visual acuity test of the operator may be performed with the displayed visual acuity test mark to acquire the visual acuity data on the spot. Additionally, information on eyes other than visual acuity may be acquired. For example, information on the use of contact lenses and eyeglasses, information on eye injuries and diseases, and the like may be acquired.

Further, a method of acquiring maneuvering experience data, which is a characteristic of the operator, may include acquiring information on an experience of maneuvering the unmanned aerial vehicle from the storage unit 132 in which the information is registered in advance. Examples of maneuvering experience data include a total maneuvering time, a total time over which the unmanned aerial vehicle is invisible, certification grades and the like, and degrees of wobble (for example, angles) of the face and the line-of-sight as described above. A new registrant or an operator for whom no maneuvering experience data is registered may be let to perform a test flight of the unmanned aerial vehicle 11 in practice, to test and acquire a maneuvering experience (proficiency level) on the field.

As the process of acquiring characteristic data such as sex and height of the operator, the operator may be prompted to input the characteristic data via the remote controller 12 or the mobile device. In a case where the data is stored in advance in the storage unit, the data may be acquired from the storage unit.

(2-1B: Information on Surrounding Flight Conditions of Unmanned Aerial Vehicle)

The ways of acquiring information on surrounding flight conditions of the unmanned aerial vehicle 11 may include acquiring information based on a captured image of the image-capturing unit 113b (or the image-capturing unit 113a) of the unmanned aerial vehicle 11, acquiring based on detection information of the obstacle detection unit 118, acquiring based on map information, setting via the remote controller 12 by the operator according to the operator's decision, or the like. When an image-capturing unit such as a camera is provided in the remote controller 12, a surrounding image may be captured by the image-capturing unit, or an image captured by the operator with the camera of the mobile device may be used.

(2-1C: Information on Weather)

The process of acquiring information on weather may include acquiring weather forecast via the Internet. Further, information may be acquired from various sensors such as an illuminance sensor, a temperature sensor, a humidity sensor, and the like (not illustrated) provided in the unmanned aerial vehicle 11. The information on weather include wind strength, weather information such as sunny or rainy, a precipitation, an amount of pollen, a quantity of particles affecting visibility such as Particulate Matter 2.5 (PM2.5), and the like. The information may be acquired by processing an image captured by the image-capturing unit provided in the unmanned aerial vehicle 11, the remote controller 12, or other mobile devices.

(2-1D: Information Input by Operator)

The process of acquiring information input by the operator to the remote controller 12 or the mobile device held by the operator may include acquiring information from the remote controller 12 or the mobile device via the communication network 14.

(2-2: Setting of Predetermined Range)

Next, processes of setting a predetermined range in which the unmanned aerial vehicle 11 is permitted to fly in step S32 of FIG. 7 will be described.

(2-2A: In the Case of Information on Characteristics of Operator)

First, a case where the information acquired in step S31 is information on characteristics of the operator will be described. In other words, a case where the range is set based on characteristics of the operator will be described. The characteristics of the operator include, for example, visual acuity, sex, age, height, weight, and the like. Additionally, the characteristics may include a maneuvering experience and proficiency level of the unmanned aerial vehicle 11.

The ways of setting a flight range include setting a flight range by referring to table data or the like stored in the storage unit 132, calculating a flight range using a correction coefficient k stored in the storage unit 132, setting a flight range to a range set for a similar another operator, and the like.

First, how to set a flight range by referring to table data and the like will be described with reference to FIG. 10. In the storage unit 132, data is stored in which information required for setting the flight range and a threshold corresponding to the flight range are associated. The threshold for setting the flight range may be the threshold of the face proportion, the distance threshold, the motion amount threshold of the face (head) or line-of-vision of the operator, the angle threshold, or the like as described in the first embodiment. The face proportion threshold is a proportion occupied by the face included in an image, with the size of the entire image being 1. Although the motion amount threshold is described as speed by way of example, the motion amount threshold is not limited to speed. For example, the motion amount threshold may be acceleration, a proportion to a predetermined value, or other values. The setting unit 1331 may set the face proportion threshold to $1/10$ when a visual acuity of the operator is measured to be 1.2. In this case, the setting unit 1331 may set the distance threshold to 7 m, set the motion amount threshold to 3 m/s, and set the angle threshold to 75 degrees.

Note that each threshold may also depend on the size of the unmanned aerial vehicle 11. For example, in the data table illustrated in FIG. 10(a), the distance threshold is set to 7 m when the measured visual acuity is 1.0. This threshold is a value relating to an unmanned aerial vehicle having a predetermined size. When the size of an unmanned aerial vehicle 11 is larger than the predetermined size, the distance threshold (the distance within which the operator can visually recognize the unmanned aerial vehicle 11) is larger than 7 m. This is because a large vehicle body is easy to be visually recognized. Thus, a data table according to the size of the unmanned aerial vehicle 11 is used. In other words, in the storage unit 132, a data table as illustrated in FIG. 10 is stored for each of unmanned aerial vehicles having different sizes, and the data table corresponding to the size of the unmanned aerial vehicles 11 can be used to set a predetermined range (threshold).

The setting unit 1331 sets the threshold (flight range) in this way, so that the estimation unit 1332 can estimate whether the unmanned aerial vehicle 11 is flying in the set range based on the threshold (flight range) set by the setting unit 1331. The estimation unit 1332 may estimate using the face proportion threshold, the distance threshold, the motion amount threshold, the angle threshold, or other thresholds. A plurality of thresholds among these may be used for the estimation. In this case, a more accurate estimation can be made.

Next, the calculation of a threshold by using the correction coefficient k will be described with reference to FIG. 10(b). The example illustrated in FIG. 10(b) shows correction coefficients for the face proportion threshold, the distance threshold, the motion amount threshold, and the angle threshold when the thresholds in a case of the measured visual acuity being 0.7 to 1.0 or less are set as initial thresholds. The storage unit 132 stores data in which information required for setting the flight range and each correction coefficient k are associated, as illustrated in FIG. 10(b). The threshold can be set by calculating an equation: (threshold after correction)=k×(initial threshold).

First, a case where the information required for setting the flight range is visual acuity will be described by way of example. For the initial threshold of the distance of 200 m, the distance threshold can be set by calculating 200 m×k1. For example, when the measured visual acuity of the operator is 1.2, the distance threshold correction coefficient k1 is 2. Thus, the distance threshold (the range in which the unmanned aerial vehicle 11 is permitted to fly) is set to 200 m×2=400 m.

Next, a case where the correction coefficient k2 of the face proportion threshold is used will be described. In a case where the initial threshold of the face proportion is $1/10$ and the measured visual acuity of the operator is 0.6, the face proportion threshold (the range in which the unmanned aerial vehicle 11 is permitted to fly) is set to $1/10$ (initial threshold)×2 (correction coefficient k2 of visual acuity 0.6)=$1/5$. In other words, the operator with the measured visual acuity of 1.0 is allowed to fly the unmanned aerial vehicle 11 in a range in which the proportion of the face of the operator to the area of the entire image data is larger than $1/10$, but is not allowed to fly the unmanned aerial vehicle 11y in a range in which the proportion is smaller than $1/10$. An operator with the measured visual acuity of 0.6 is allowed to fly the unmanned aerial vehicle 11 in a range in which the proportion of the face of the operator to the area of the entire image data is larger than $1/5$, but is not allowed to fly the unmanned aerial vehicle 11 in a range in which the proportion is smaller than $1/5$.

Next, a case where the motion amount threshold k3 is used will be described. For example, when the initial threshold of the motion amount is 1 m/s and the measured visual acuity of the operator is 1.5, the motion amount threshold is set to 1 m/s×3=3 m/s. In other words, for the operator with the measured visual acuity of 1.5, a case where the motion of the face (head) or the line-of-sight (line-of-vision) is smaller than 3 m/s is set to the predetermined range. Therefore, when the motion of the face (head) or the line-of-sight (line-of-vision) is smaller than 3 m/s, the estimation unit 1332 estimates that the operator cannot currently visually recognize the unmanned aerial vehicle 11 (the unmanned aerial vehicle 11 is not flying within the predetermined range).

A case where the angle threshold k4 is used will be described. For example, when the initial threshold of the angle is 60 degrees and the measured visual acuity of the operator is 0.3, the angle threshold is set to 60 degrees× 0.3=18 degrees. In other words, a range within the viewing angle of 18 degrees from the line-of-sight direction of the operator is set as the predetermined range (threshold).

In this way, a wider range can be set for operators with good visual acuity, and a narrower range can be set for operators with poor visual acuity. Since a range in which an operator can visually recognize the unmanned aerial vehicle varies depending on the visual acuity of the operator, an appropriate flight range can be set for each operator.

Next, a case where the information required for setting the flight range is maneuvering experience will be described by way of example.

It is assumed that the maneuvering experience is classified into five stages: "A", "B", "C", "D", and "E". For example, A is a rich maneuvering experience class and E is a little maneuvering experience class. The classification may be based on the certification grades or the like, or based on the total maneuvering time or the like. By way of example, it is assumed that the total maneuvering time of 20 hours or more falls in the maneuvering experience A, the total maneuvering time of 15 hours to less than 20 falls in the maneuvering experience B, the total maneuvering time of 10 hours to less than 15 falls in the maneuvering experience C, the total maneuvering time of 5 hours to less than 10 falls in the maneuvering experience D, and the total maneuvering time of less than 5 hours falls in the maneuvering experience E.

In the case of the method of setting a flight range by referring to table data or the like, each threshold (predetermined range) as illustrated in FIG. 10(a) is set for the operator in the maneuvering experience B.

In the case of the calculation using the correction coefficient k, a threshold in the maneuvering experience C may be set as the initial threshold as illustrated in FIG. 10(b). In the example as illustrated in FIG. 10(b), a wider flight range can be set for an operator with rich maneuvering experience, while a narrower flight range can be set for an operator with less maneuvering experience. By setting a narrower flight range for an operator with less maneuvering experience, a reliable and safe flight can be assured. For the correction coefficient k3 of the motion amount threshold and the correction coefficient k4 of the angle threshold, the range (threshold) can also be set as described above.

When the flight range is set in consideration of only the maneuvering experience, the corrected threshold may be: (corrected threshold)=(correction value k corresponding to maneuvering experience)×(initial threshold). In contrast, when the flight range is set in consideration of both the visual acuity and the maneuvering experience, the corrected threshold may be calculated as: (corrected threshold)=(correction value k corresponding to maneuvering experience)× (correction value k corresponding to visual acuity)×(initial threshold).

The numerical values illustrated in FIGS. 10(a), (b) are merely examples, and the present invention is not limited thereto. Additionally, it is not necessary to set all the thresholds or correction coefficients. It is only necessary to set any one of the thresholds or correction coefficients. More than one of them may also be set.

Next, how to set a flight range based on a range set for a similar another operator will be described.

The similar another operator may be an operator having at least one of age, sex, height, weight, visual acuity, maneuvering experience, and the like similar to that of the target operator. The storage unit 132 of the server 13 stores information on a large number of operators, such as age, sex, height, weight, visual acuity, maneuvering experience, and the like. The setting unit 1331 extracts another operator having characteristics similar to those of an operator M received by the communication unit 131 (e.g., age, sex, height, weight, visual acuity, maneuvering experience), and sets a range (threshold) set for the extracted other operator also for the operator M. Here, "similar" means that, in terms of sex, operators have the same sex. In terms of age, height, weight, visual acuity, maneuvering experience, or the like, "similar" means that data falls within a predetermined width or margin therefor. Since a range (threshold) set for another operator similar to the target operator can be set as a range for the target operator, an appropriate range (threshold) can be set. A plurality of ranges (thresholds) set for similar other operators may be extracted to set an average value thereof.

(2-2B: In the Case of Information on Surrounding Flight Conditions of Unmanned Aerial Vehicle)

Next, a case where the information acquired in step S31 of FIG. 7 is information on surrounding flight conditions of the unmanned aerial vehicle 11 will be described. The surrounding flight conditions of the unmanned aerial vehicle 11 include place, view, the number of people, surrounding objects, and the like.

Different surrounding flight conditions of the unmanned aerial vehicle 11 lead to a different number of obstacles between the unmanned aerial vehicle 11 and the operator, different degrees of visibilities, and the like, so that the range in which the operator can visually recognize the unmanned aerial vehicle may be different. Additionally, the ease of visual recognition of the unmanned aerial vehicle 11 may also vary depending on a relationship between the unmanned aerial vehicle 11 and its background. Here, how to set a threshold according to such surrounding conditions will be described.

When the information acquired in step S31 of FIG. 7 is an image obtained by photographing scenery around the unmanned aerial vehicle 11 by the image-capturing unit 113a, the server 13 acquires image information from the unmanned aerial vehicle 11 and recognizes buildings, trees, and the like in the image by pattern recognition to determine the surroundings as a town, an environment with many trees such as forests or woods, or an environment like a plain with a good visibility, etc. In that case, the heights of buildings or trees may also be calculated and used as references for judgment. Also, it can be determined from the image whether or not the unmanned aerial vehicle flies indoors. It can also be determined how many people are there. In this way, it is possible to determine the surrounding conditions by the number, size, or the like of objects in the flight location.

It is also conceivable that the information acquired in step S31 is detection information of the obstacle detection unit 118. For example, when a millimeter wave radar is mounted as the obstacle detection unit 118, millimeter waves are transmitted to surroundings of the unmanned aerial vehicle 11 and the reflected waves are received to map surrounding conditions and judge the surrounding environment. Moreover, when using the map information, it can be determined whether a flight location of the unmanned aerial vehicle is a town, a field or grassland, a sandy beach, on the sea, or other locations, based on GPS positional information of the unmanned aerial vehicle 11 or the remote controller 12 and map information obtained through the Internet or stored in the storage unit 132.

Additionally, the operator may operate the remote control 12 to input environmental conditions. For example, characters and icons indicating a plurality of types of conditions are displayed on the display unit 121 of the remote controller 12 so that the operator can select one of them.

How to set a threshold include a method of setting a threshold by referring to the data table or the like as illustrated in FIG. 10(a) stored in the storage unit 132, a method of calculating a threshold by using the correction coefficient k as illustrated in FIG. 10(b), and the like as described above.

For example, it is assumed that the judgement is made with a classification of the surrounding conditions into four types: city town, suburbs, field or grassland, and indoors. For example, referring to FIG. 10(a), in a case where the information acquired in step S31 is information indicating suburbs, the distance threshold can be set to 5 m, the threshold of the face proportion can be set to ⅕, the motion amount threshold can be set to 2 m/s, and the angle threshold can be set to 60 degrees. Further, referring to FIG. 10(b), in a case where the information acquired in step S31 is information indicating city town, correction coefficients can be set as follows: k1=0.5, k2=2, k3=0.5, k4=0.5.

By setting in this way, the flight range is set to be narrower in a town with a bad visibility or many people and buildings so that the flight is dangerous. A wider flight range can be set in fields or grasslands with good visibility and a small number of obstacles. Further, a narrower flight range can be set for an indoor flight. Thus, an appropriate flight range can be set depending on places.

It is also possible to set the flight range (threshold) depending on the background when the operator watches the unmanned aerial vehicle 11. The background when the operator watches the unmanned aerial vehicle 11 may be sky, trees, buildings, or the like. The ease of visual recognition varies depending on whether or not such a background has a color similar to that of the unmanned aerial vehicle 11. For example, when a blue unmanned aerial vehicle 11 flies in a blue sky, it is difficult to visually recognize the unmanned aerial vehicle 11 because of the similar colors. In such a case, a threshold is set so as to narrow the flight range. For example, the flight range is set based on a currently set threshold and a correction value. Specifically, when a currently set distance threshold is 10 m and a correction value in a case where the background and the unmanned aerial vehicle 11 have similar colors is 0.8, the threshold can be set to 10 m×0.8=8 m. In this way, an optimum threshold (flight range) can be set depending on situations where the operator has a difficulty in visually recognizing the unmanned aerial vehicle, for example.

The flight range (threshold) may also be set according to a situation of the operator. When the operator performs a certain action, the attention of the operator to the unmanned aerial vehicle 11 decreases. Thus, the threshold may be set so that the flight range becomes narrower.

Such a situation may be, for example, a situation where it is determined based on the GPS positional information of the remote controller 12 that the operator is moving. Further, such a situation may be a situation where it is determined that the operator has an accompanying person, a situation where it is determined that the operator is talking to an accompanying person, a situation where the operator is talking with a mobile device, or a situation where it is determined that the operator is operating a mobile device, based on a captured image of the image-capturing unit 113*b* of the unmanned aerial vehicle 11. Note that when the mobile device is used as a remote controller, it may be directly determined by the information from the mobile device that the operator is on the phone or is operating the mobile device, without using the captured image.

In this way, the flight range can be set narrower when a situation decreasing the attention of the operator is detected. The operator can thus maneuver reliably and safely.

The flight range (threshold) may also be set depending on whether other unmanned aerial vehicles are flying around the own vehicle.

In a case where other unmanned aerial vehicles are flying around the unmanned aerial vehicle 11, it becomes difficult to distinguish the unmanned aerial vehicle 11 from others. The threshold may thus be set so as to narrow the flight range. A method of judging that other unmanned aerial vehicles are flying around the own vehicle may include judging that other unmanned aerial vehicles are flying around the own vehicle by communication between the unmanned aerial vehicles.

It is also possible to cause the server 13 to store the current value of the GPS positional information of each unmanned aerial vehicle and to judge whether other unmanned aerial vehicles are flying near the unmanned aerial vehicle 11 using the GPS positional information. Alternatively, the surroundings of the unmanned aerial vehicle 11 may be photographed by the image-capturing unit 113*b* of the unmanned aerial vehicle 11 or the image-capturing unit mounted on the remote controller 12, and it may be judged from the captured image that other unmanned aerial vehicles fly around the unmanned aerial vehicle.

Next, a case where the information acquired in step S31 of FIG. 7 is information on weather will be described.

(2-2C: In the Case of Information on Weather)

A case where information on weather is information on haze, fog, rain, pollen amount, and the like, as well as occurrence of PM2.5 will be described. The haze, fog, rain, and the like or the occurrence of PM2.5 can be determined based on a captured image of the image-capturing unit 113*b* of the unmanned aerial vehicle 11. Further, sensors for measuring humidity, water vapor amount, wind speed, and the like may be mounted on the unmanned aerial vehicle 11 or the remote controller 12, and determination may be made based on the measurement data. Alternatively, weather information on the Internet may be acquired to make a determination. Then, for haze, fog, rain, or the like, the threshold (range) can be set to become narrower than that for sunny or cloudy. Further, as an amount of pollen and PM2.5 increases, the range can be set to become narrower.

Alternatively, weather conditions may be input by the operator using the remote controller 12, so that a threshold (flight range) may be set based on the input information.

For example, as illustrated in FIGS. 10(*a*), (*b*), thresholds and correction coefficients can be set according to weather. Further, thresholds and the correction coefficients may be set according to wind speed. In this case, a narrower range may be set when the wind speed is high, and a wider range may be set when the wind speed is low.

Also, when a sun is in a direction in which the operator watches the unmanned aerial vehicle 11, that is, in a case of backlight, the flight range may be set to be narrower. As the information for determining backlight, it is possible to use the position of the sun based on the season and the time, the GPS positional information and the like, the captured image of the image-capturing unit 113*b* of the unmanned aerial vehicle 11 and the like. Further, when the remote controller 12 is provided with a camera and a digital compass, images and azimuth information acquired by them can be used. From the photographed surrounding scenery, images and azimuth information may be acquired using a mobile device including a camera and a digital compass.

Based on the acquired information, the server 13 judges whether or not backlight occurs when the operator observes the unmanned aerial vehicle 11. In the case of backlight, the server 13 changes the threshold so that the flight range becomes narrower.

(2-2D: In the Case of Information Input by Operator)

Next, a case where the information acquired in step S31 of FIG. 7 is information input by the operator to the remote controller 12 or the mobile device held by the operator will be described.

For example, a display unit is provided in the unmanned aerial vehicle 11. Then, the unmanned aerial vehicle 11 hovers at a position separated from the operator by a predetermined distance to display indications (characters, color, motion of an image, and the like) on the display unit of the unmanned aerial vehicle 11. The operator is then prompted to answer what is displayed thereon via the remote controller 12 or another mobile device. Such measurement is performed at a plurality of positions, and the server 13 can set thresholds and correction coefficients based on the answer result at each position. For example, a predetermined range may be set so that a flight position at which the operator makes a mistake is a boundary of the flight range. Alternatively, a measurement is performed at a distance corresponding to the initial value of the distance threshold. If the operator answers that he/she can visually observe the vehicle, the correction coefficient of the distance threshold is set to 1, while if the operator answers that he/she cannot visually observe the vehicle, the correction coefficient is set to less than 1. Note that the unmanned aerial vehicle 11 may be provided with an LED or the like, instead of a display unit, to prompt the operator to answer light color.

(2-3: Change in Predetermined Range)

Next, a method of changing the predetermined range in which the unmanned aerial vehicle 11 is permitted to fly in step S34 of FIG. 7 will be described.

The setting of the predetermined range in step S31 described above is basically performed at a flight start of the unmanned aerial vehicle 11. Of course, the range may be set before the flight start, after the flight start, or simultaneously with the start. However, the situation may change after the setting unit 1331 sets the range in which the unmanned aerial vehicle 11 is permitted to fly. When such a change in the situation is detected, the threshold (range) and the correction coefficients may be changed. Note that the change in the situation may be detected automatically. The operator may determine a change in the situation and operate the remote controller 12 or the mobile device to change the threshold (flight range).

For example, when it is detected from captured images of the image-capturing unit 113a and the image-capturing unit 113b or positional information detected by the position detection unit 115 that a flight position of the unmanned aerial vehicle 11 changes from suburbs to city town, the flight range can be changed from a flight range based on suburbs to a flight range based on town. In other words, by changing the threshold or the correction coefficients, the flight range can be changed to be narrower. Conversely, when it is detected that a flight location of the unmanned aerial vehicle 11 changes from city town to suburbs, the flight range can be changed from a flight range based on town to a flight range based on suburbs. In other words, the flight range can be changed to be wider. Also, when weather in the flight location changes from sunny to cloudy, the flight range can be changed from a flight range based on sunny conditions to a flight range based on cloudy conditions. Further, when it is detected based on GPS positional information or the like that the operator who has stopped to maneuver the unmanned aerial vehicle 11 now starts to move, the flight range of the unmanned aerial vehicle 11 is changed to be narrower. In other words, as follows: information acquired at a first point in time is referred to as first information and information acquired at a second point in time after the first point in time is referred to as second information. The first information and the second information as used here are information required for setting the above-described predetermined range. In other words, the information includes, for example, information on characteristics of the operator (e.g., visual acuity, sex, height, experience of maneuvering the unmanned aerial vehicle 11), information on surrounding flight conditions of the unmanned aerial vehicle (place, sight view, the number of people, surrounding objects), information on weather, information input by the operator to the remote controller 12 or the mobile device held by the operator. The first information and the second information are acquired at different points in time. When the first information and the second information are compared and a change is found (the first information and the second information are different), the range can be changed based on the second information acquired later.

By performing such a process, a proper flight range can be set whenever necessary. Note that the process of step S34 is not indispensable.

Further, when the operator operates the remote controller 12 to control the flight of the unmanned aerial vehicle 11, a flight trajectory of the unmanned aerial vehicle 11 is stored in the storage unit 132 of the server 13. When the flight trajectory is smooth, each threshold and correction coefficient may be changed to widen the predetermined range.

Note that the plurality of threshold settings described above may be employed alone or in combination. In the case of employing a plurality of threshold settings in combination, for example, when there are n correction coefficients such as k1, . . . , kn with respect to the thresholds, the initial threshold may be corrected by k 1×k 2× . . . ×kn, which is a multiplication of the correction coefficients. In other words, the corrected threshold may be calculated as: (corrected threshold)=(initial threshold)×k 1×k 2× . . . ×kn.

Alternatively, when there are five correction coefficients such as k1<k1<k3<1, 1<k4<k5, the initial threshold may be corrected by k1×k5, which is a multiplication of the smallest k1 by the largest k5. Note that, when there are three correction coefficients k1<k1<k3<1 or there are two correction coefficients 1<k4<k5, the initial threshold may be corrected by the smallest k1 or the largest k5.

By performing the processes as described above, it is possible to appropriately set the range in which the unmanned aerial vehicle 11 is permitted to fly, depending on the operator and/or surrounding conditions. A suitable flight range can be set for each operator. A suitable flight range can be set for each weather, place, or the like. Further, when the operator or the flight environment changes, the flight range can be reset whenever necessary so that an appropriate range can be maintained.

Third Embodiment

Next, a flight control in a case where it is estimated that the flight position of the unmanned aerial vehicle 11 is out of the predetermined range will be explained with reference to FIG. 6. The flight control in step S9 of FIG. 6 will be mainly described in detail. The predetermined range may be, for example, a range in which the operator can monitor (check, visually recognize, visually observe) the unmanned aerial vehicle 11, a range in which the operator does not lose sight of the vehicle, or a range in which the control signal of the remote controller 12 is accepted. Such a range may be, for example, a range in the front direction of the operator, a range within a predetermined angle from the line-of-vision direction of the operator, or a range that does not include a range behind the operator. Further, a range obstructed by the obstacle from the operator may not be included in the predetermined range.

A case where it is estimated that the flight position of the unmanned aerial vehicle 11 is out of the predetermined range may include, for example, a case where it is estimated that the unmanned aerial vehicle 11 is flying out of the predetermined range in the first embodiment described above. Note that, basically, control operations by the remote controller 12 may not be accepted when the estimation unit 1332 estimates that the flight position of the unmanned aerial vehicle 11 is out of the predetermined range.

In step S9 of FIG. 6, the flight control unit 112 controls the flight unit 111 to perform an avoidance control for avoiding a flight out of the predetermined range. The avoidance control is a control performed when the estimation unit 1332 estimates that the unmanned aerial vehicle 11 is flying out of the predetermined range. The avoidance control includes, for example, (1) a hovering control, (2) a control toward within a predetermined range, (3) a control for flying to a preset position, (4) a control for the unmanned aerial vehicle 11 by itself determining its flying position and direction.

(3-1: Hovering Control)

When the estimation unit 1332 estimates that the unmanned aerial vehicle 11 is flying out of the predetermined range, the flight control unit 112 controls the flight unit 111 to hover on the spot. Alternatively, the flight control unit 112 may fly the unmanned aerial vehicle 11 in a direction toward the operator or in a direction matching the direction of the line-of-sight of the operator, and then hover the vehicle at that position. The flight control unit 112 can generate a signal for controlling the flight unit 111, to control the flight unit 111. Additionally, when there is an obstacle, a hovering state may be maintained after moving upward to avoid the obstacle and make it easy for the operator to watch the unmanned aerial vehicle 11.

Figure 5:
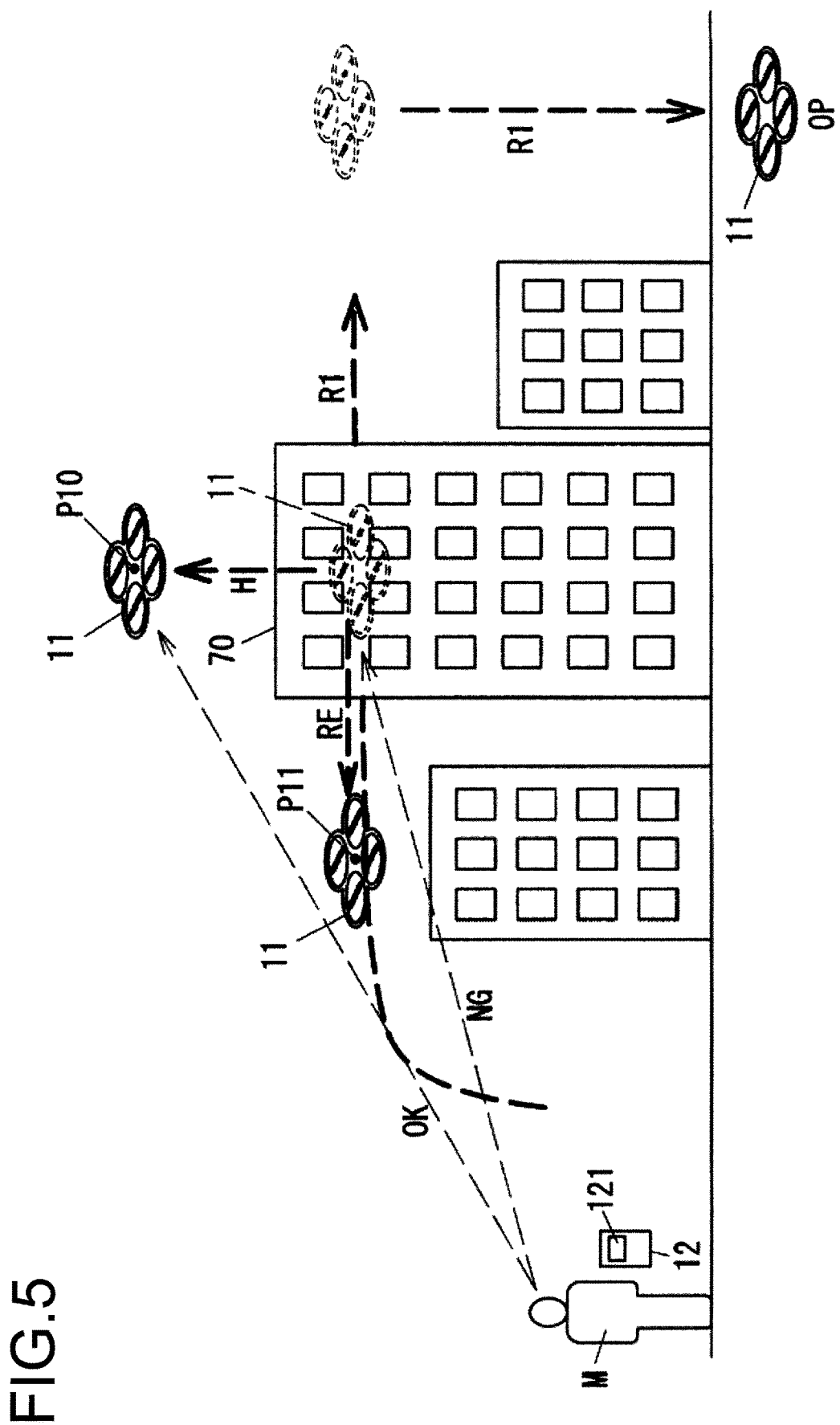
FIG. 5 is a schematic view illustrating an avoidance operation.

FIG. 5 is a schematic diagram illustrating an example of the hovering control. When the unmanned aerial vehicle flies in a flight route R1 in which the unmanned aerial vehicle flies behind a building 70 as illustrated in FIG. 5, it is impossible for the operator to visually observe the unmanned aerial vehicle 11 when the unmanned aerial vehicle 11 hides behind the building 70, which means that the unmanned aerial vehicle 11 is flying out of the predetermined range.

In that case, a flight altitude may be increased as indicated by reference symbol H and the hovering state is then kept at the position indicated by reference symbol P10. As a result, the unmanned aerial vehicle 11 appears from behind the building 70, so that the operator can check the unmanned aerial vehicle 11. The fact that the operator can now check the unmanned aerial vehicle 11 can be determined, for example, from the fact that the operator appears in an image captured by the image-capturing unit 113a of the unmanned aerial vehicle 11. Further, the operator may be prompted to answer whether he/she can visually observe the vehicle, via the remote controller 12. Note that, at this time, light and sound may be generated from the unmanned aerial vehicle 11 to get attention of the operator. Alternatively, the positional information of the unmanned aerial vehicle 11 may be displayed on the remote controller 12. An alert such as an alert sound may be issued from the remote controller 12. Note that control operations by the remote controller 12 may not be accepted during the avoidance control. The state not accepting the maneuvering operation may be released when the estimation unit 1332 has estimated that the vehicle is flying within the predetermined range (the operator can currently visually recognize the unmanned aerial vehicle 11).

When the estimation unit 1332 has estimated that the unmanned aerial vehicle 11 is flying within the predetermined range by such an avoidance control, the server 13 resumes the flight control to a destination OP. At that time, in a case of an automatic flight mode of the unmanned aerial vehicle 11, the unmanned aerial vehicle 11 may automatically change its route to a flight route along which the unmanned aerial vehicle 11 does not fly behind the building 70. In the case of a semiautomatic flight mode that also allows a flight by operation of the remote controller 12, the flight to the destination OP may be resumed after the operator manually flies the unmanned aerial vehicle 11 to a position apart from the building 70. In addition, in the case of a flight mode by remote controller maneuvering, maneuvering with the remote controller 12 may be started from the position P10. Note that, in the case where the hovering as described above fails to bring the unmanned aerial vehicle into a visible state, the server 13 may perform any of other avoidance controls described later.

(3-2: Control Toward within Predetermined Range)

A second avoidance control may be a control for flying the vehicle in a direction toward within the predetermined range. A direction within the predetermined range may be a direction of reversing the unmanned aerial vehicle 11 to a position P11 along the flight path, such as a flight path indicated by reference symbol RE in FIG. 5. Also, the direction may be a direction toward the operator. Note that, at this time, light and sound may be generated from the unmanned aerial vehicle 11 to get attention of the operator. The position P11 is, for example, set to a position where the unmanned aerial vehicle 11 reverses by a predetermined distance. At that time, a surrounding map and a current position of the unmanned aerial vehicle 11 may be displayed on the display unit 121 of the remote controller 12.

The unmanned aerial vehicle 11 may also return to a position of the operator. While the unmanned aerial vehicle reverses along the flight route, the operator may be asked whether or not he/she can visually observe the vehicle. When the answer from the operator indicates that he/she can visually observe the vehicle, the unmanned aerial vehicle may hover to wait for an instruction from the operator, or automatically resume the flight operation to the destination.

In the case of the flight mode in which the flight control is performed by operating the remote controller 12, the operator is notified with a display on the display unit 121 or the like that the unmanned aerial vehicle 11 performs a return flight, during which the flight maneuver by the remote controller 12 may not be accepted.

(3-3: Control for Flying to Preset Position)

A third avoidance control may be a control for flying the unmanned aerial vehicle 11 to a predetermined position P which is set in advance. Note that a plurality of predetermined positions to the destination may be set in advance so that the unmanned aerial vehicle flies to the nearest predetermined position P. Note that a surrounding map and the predetermined position P to which the vehicle has moved may be displayed on the display unit 121 of the remote controller 12 or the display unit of the mobile device of the operator to inform the operator of a current position of the unmanned aerial vehicle 11.

After moving to the predetermined position P, the unmanned aerial vehicle may perform landing. At that time, the image-capturing control unit 114 may monitor a suspicious person approaching the unmanned aerial vehicle 11, by the image-capturing unit 113a or the image-capturing unit 113b mounted on the unmanned aerial vehicle 11. Further, a human sensor using infrared light, ultrasonic wave, visible light, or the like may be mounted on the unmanned aerial vehicle 11 to notify the server 13 or the remote controller 12 of any approaching person detected by the human sensor. In such a case, the suspicious person may be photographed by the image-capturing unit 113a or the image-capturing unit 113b, and the captured image may be transmitted to the server 13 and the remote controller 12. When any suspicious person is detected, the unmanned aerial vehicle 11 may rise above the sky to avoid danger or move to another predetermined position.

(3-4: Control for Unmanned Aerial Vehicle 11 by Itself Determining Position and Direction)

A fourth avoidance control may be a control for the unmanned aerial vehicle 11 by itself determining its flying position and direction.

For example, a surrounding image may be photographed by the image-capturing unit 113a of the unmanned aerial vehicle 11 to autonomously search for a safe place and direction. The safe place is, for example, a place without obstacles, a flat place, or a place with less people. The control for searching for such a safe position may be performed by the server 13 or by the unmanned aerial vehicle 11. In such a case, templates relating to places that can be regarded in advance as safe places are registered in a storage unit (not illustrated) of the unmanned aerial vehicle 11 or the storage unit 132 of the server 13, and a template read out from the storage unit 132 is compared with the captured image to judge whether or not a target place is safe. For example, places on water, with road signs, with irregularities, and the like are not judged as safe places.

When a safe place is found, the unmanned aerial vehicle flies to that location. The unmanned aerial vehicle may land on the safe place. A surrounding map and the landing position may be displayed on the display unit 121 of the remote controller 12 or the display unit of the mobile device of the operator to inform the operator of the current position of the unmanned aerial vehicle 11. After the landing, the monitoring of any suspicious person described above may be performed. When a suspicious person is found, the unmanned aerial vehicle moves and evacuates to another place and the place which the vehicle has evacuated to may be transmitted to the remote controller 12 or the server 13.

After the unmanned aerial vehicle 11 autonomously performs the operation of searching for a safe place, the final decision as to whether or not the place is safe may be made by the operator. For example, the unmanned aerial vehicle 11 transmits an image of a searched landing point and its surroundings to the remote controller 12, and the operator determines whether or not the landing to the point is allowed. If the operator determines that the point is proper as a landing point, the operator operates the remote controller 12 to transmit a signal for permitting the landing. During the landing point searching, the operation for permitting the landing may be permitted, but the maneuvering operation by the remote controller 12 may not be permitted. Upon receiving the permission signal, the unmanned aerial vehicle 11 may land on the landing point. Operations after the landing may be the same as those in the case described above.

Note that, in this case, the unmanned aerial vehicle 11 autonomously performs the search for the landing point and the operator determines the safety of the landing point; however, instead of the maneuvering operation by the remote controller 12 being not permitted, the landing point searching may also be performed by the operator operating the remote controller 12.

Each of the avoidance controls has been described in (1) to (4) above. Any one of the avoidance controls may be set in advance and the set avoidance control may be executed. Further, more than one avoidance controls may be set. In that case, execution priorities may be determined for more than one avoidance controls. For example, priorities are set in the order of (1), (2), (3), and (4). The avoidance controls are sequentially executed in the order of descending priorities. When the flight position is not within the predetermined range even if an avoidance control is performed or when an avoidance control cannot be executed, an avoidance control having the next priority is executed.

For example, when the flight position does not fall within the predetermined range (the operator cannot visually recognize the unmanned aerial vehicle 11) even after a hovering control in the avoidance control of (1) continues for a predetermined time, the control shifts to the avoidance control of (2). If it is determined that the vehicle cannot be returned to the predetermined range due to wind, obstacles, a battery remaining amount, or the like during the flight in a direction toward within the predetermined range in the avoidance control of (2), the control shifts to the avoidance control of (3). If it is determined that the vehicle cannot be moved to a predetermined position due to wind, obstacles, a battery remaining amount, or the like in the avoidance control of (3), the control shifts to a danger avoidance action of (4).

Note that the priorities in the order of (1), (2), (3), and (4) is merely an example. For example, any one of the avoidance controls in (2), (3), and (4) may be performed without performing the avoidance control of (1). Alternatively, the avoidance control of (4) may be performed after the avoidance control of (1). Further, the priorities may be set by the operator operating the remote controller 12.

Figure 11:
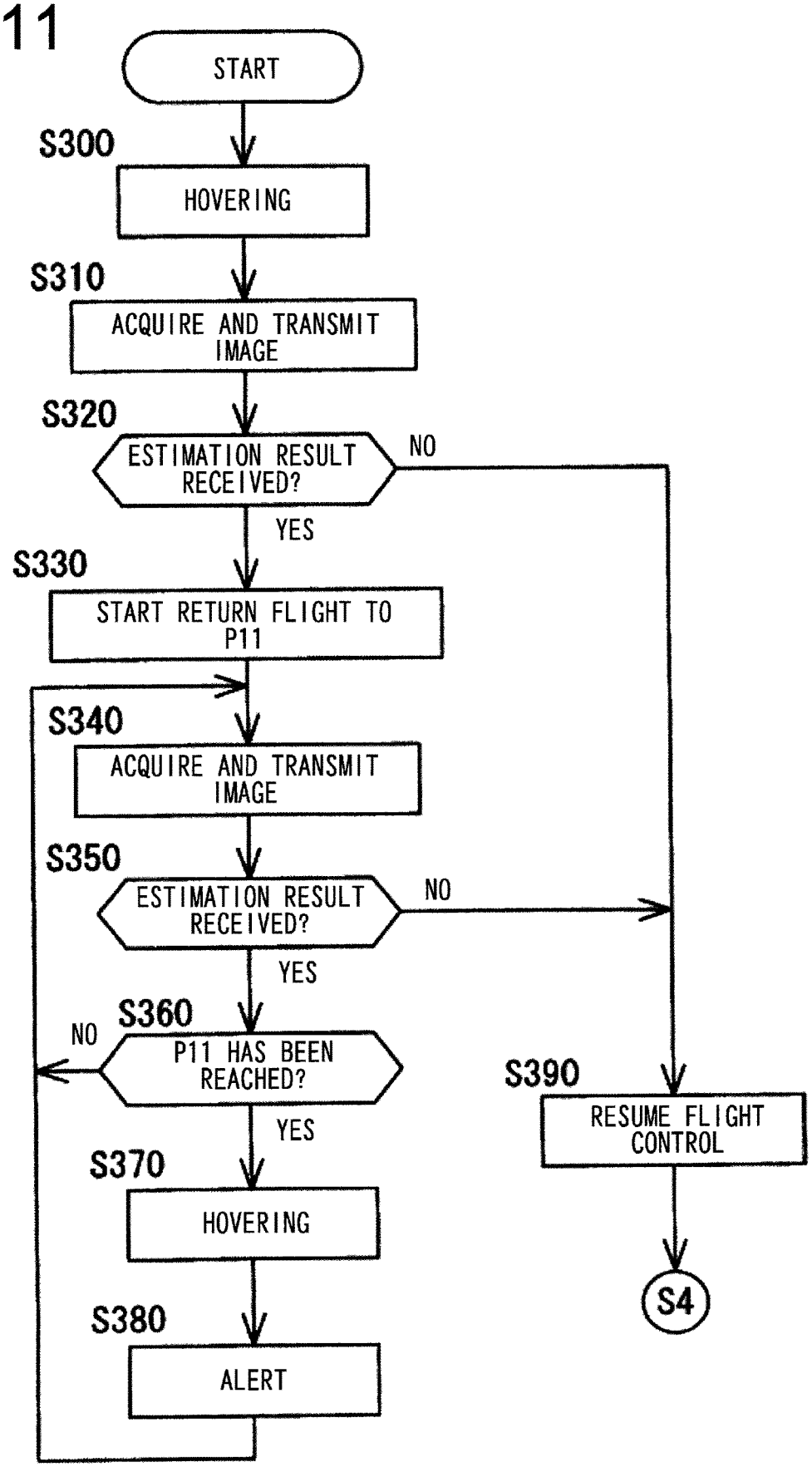
FIG. 11 is a flowchart illustrating an example of the process of step S9 of FIG. 6.

FIG. 11 is a flowchart illustrating an example of the process of step S9 of FIG. 6. The present embodiment illustrates that, in the avoidance control process in step S9, the avoidance control of (1) is performed as an avoidance control having the first priority and the avoidance control of the above (2) is performed as an avoidance control having the second priority.

(Step S300)

The flight control unit 112 controls the flight unit 111 to cause the unmanned aerial vehicle 11 to rise to a predetermined altitude (a position P10 of FIG. 5) and hover at that position. Upon completion of the process of step S300, the process proceeds to step S310.

(Step S310)

The image-capturing control unit 114 controls the image-capturing unit 113a or 113b to acquire an image. Further, the main control unit 117 controls the communication unit 116 to transmit the acquired image to the server 13. Upon completion of the process of step S310, the process proceeds to step S320.

(Step S320)

The main control unit 117 judges whether the communication unit 116 receives an estimation result transmitted in step S64 of FIG. 8, that is, a result corresponding to a case where the server 13 estimates that the unmanned aerial vehicle 11 is not flying within the predetermined range (the vehicle is flying out of the predetermined range). A method of estimating, by the server 13, whether the operator currently visually recognize the unmanned aerial vehicle 11 may be, for example, a method described in the first embodiment.

If the estimation result from the server 13 is received, the process proceeds to step S330.

On the other hand, if the estimation result from the server 13 is not received, the process proceeds to step S390.

(Step S330)

The flight control unit 112 controls the flight unit 111 to fly to the position P11 following the flight path indicated by reference symbol RE in FIG. 5 and to hover at the position P11, which is judged as a position at which the operator can visually observe the vehicle. Upon completion of the process of step S330, the process proceeds to step S340.

(Step S340)

The image-capturing control unit 114 controls the image-capturing unit 113a or 113b to acquire an image. Additionally, the main control unit 117 controls the communication unit 116 to transmit the acquired image data to the server 13. Upon completion of the process of step S340, the process proceeds to step S350.

(Step S350)

The main control unit 117 judges whether the communication unit 116 receives a result corresponding to a case where the server 13 estimates that the unmanned aerial vehicle 11 is not flying within the predetermined range (the vehicle is flying out of the predetermined range). A method of estimating, by the server 13, whether the operator currently visually recognize the unmanned aerial vehicle 11 may be, for example, a method described in the first embodiment.

If the communication unit 116 receives the estimation result, the process proceeds to step S360.

On the other hand, if the estimation result from the server 13 is not received, the process proceeds to step S390.

(Step S360)

The main control unit 117 judges whether or not the unmanned aerial vehicle 11 has reached the position P11. If it is judged that the position P11 has not been reached, the process proceeds to step S340. On the other hand, if it is judged that the position P11 has been reached, the process proceeds to step S370.

(Step S370)

The flight control unit 112 controls the flight unit 111 to cause the unmanned aerial vehicle 11 to hover at the position P11. Upon completion of the process of step S370, the process proceeds to step S380.

(Step S380)

The main control unit 117 controls the communication unit 116 to cause the remote controller 12 to generate an alert. In other words, this urges the operator to monitor the unmanned aerial vehicle 11. With the notification of urging the monitoring, the operator visually observes the unmanned aerial vehicle 11 hovering at the position P11. Upon completion of the process of step S380, the process proceeds to step S340.

(Step S390)

A flight control to a destination OP is resumed, and thereafter the process returns to step S4 of FIG. 6.

As described above, the server 13 is provided with the estimation unit 1332 to estimate whether the unmanned aerial vehicle 11 is flying within or out of a predetermined range. As a result, the flight control unit 112 can perform different controls within the predetermined range and out of the predetermined range. For example, when the vehicle is within a predetermined range, a control signal from the remote controller 12 is accepted. On the other hand, when the vehicle is out of a predetermined range, a control signal from the remote controller 12 is not accepted and an avoidance control is performed. Therefore, the operator can reliably maneuver the unmanned aerial vehicle 11. Further, safety of the flight of the unmanned aerial vehicle 11 can be ensured.

The estimation as to whether the vehicle is flying out of the predetermined range is based on a comparison between a threshold and a judgement value such as a distance between the operator and the unmanned aerial vehicle 11, a proportion occupied by the face of the operator included in an image captured by the unmanned aerial vehicle 11, or visibility conditions of the operator. Thus, a flight in a range appropriate for each operator can be achieved.

Additionally, the flight range is set based on the visual acuity of the operator, and flight environments such as a place where the unmanned aerial vehicle 11 is flying and weather. Thus, a proper flight range can be always set according to the situation at the time. Additionally, when the flight environment changes during the flight, the flight range is adjusted according to the change. Thus, the flight range can also be flexibly set according to changes in the environment.

Furthermore, the avoidance control as described above is performed in the case where it is estimated that the unmanned aerial vehicle 11 is flying out of the predetermined range. Thus, the unmanned aerial vehicle 11 can fly reliably and safely. For example, since the unmanned aerial vehicle 11 is returned to a position where the operator can visually observe the vehicle in (2) described above. Thus, even when the unmanned aerial vehicle 11 becomes invisible, the vehicle can be again returned into the visible state. Moreover, in (3), (4) described above, the unmanned aerial vehicle 11 is moved to a predetermined position or a safe position when the vehicle becomes invisible. Thus, the damage on people or objects caused by the unmanned aerial vehicle 11 can be prevented. Additionally, after moving the unmanned aerial vehicle 11, the surrounding map and the landing position are displayed on the display unit 121 of the remote controller 12 or the display unit of the mobile device of the operator to inform the operator of the landing position of the unmanned aerial vehicle 11. Thus, a loss of the unmanned aerial vehicle 11 can be prevented even if it becomes invisible.

In the above-described embodiment, the server 13 includes the setting unit 1331 and the estimation unit 1332; however, the present invention is not limited thereto. The setting unit 1331 and the estimation unit 1332 may be provided in the unmanned aerial vehicle 11 or may be provided in the remote controller 12. Further, the setting unit 1331 may be provided in the unmanned aerial vehicle, and the estimation unit 1332 may be provided in the server 13. The setting unit 1331 and the estimation unit 1332 may be provided in any of the unmanned aerial vehicle 11, the remote controller 12, and the server 13. Further, for other components, any configuration or combination may be employed.

Figure 12:
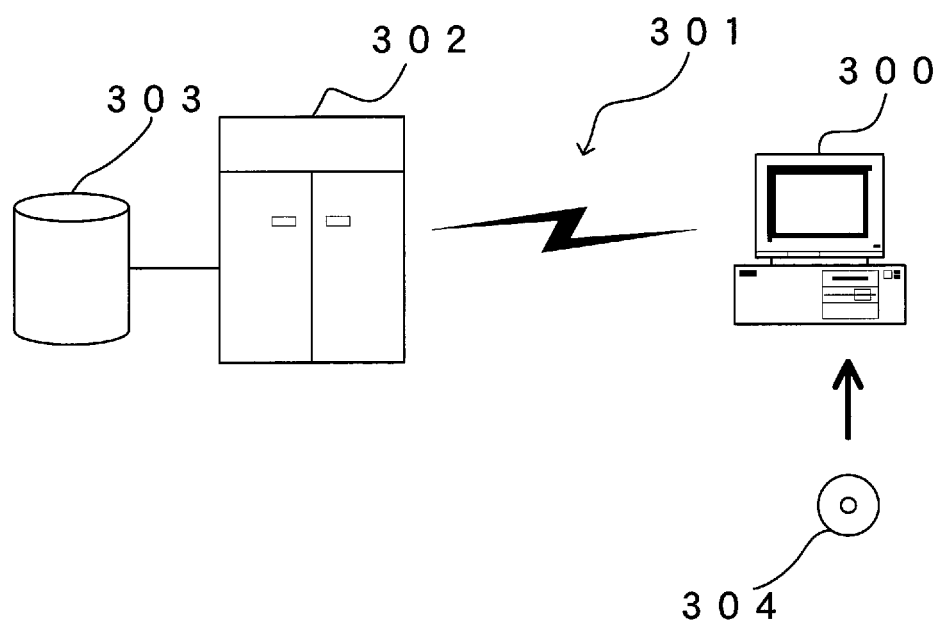
FIG. 12 is a conceptual diagram for explaining a control program according to an embodiment.

The above-described predetermined control programs are stored in a recording medium such as a ROM, a memory card, a hard disk, or the like, and are executed by the main control unit 117 of the unmanned aerial vehicle 11, the control unit 124 of the remote controller 12, and the control unit 133 of the server 13. In a case of application to a personal computer or the like, a predetermined control program can be provided via a recording medium such as a CD-ROM or in a form of data signal via the Internet or the like. FIG. 12 is a diagram illustrating the procedure. A personal computer 300 receives a program via a CD-ROM 304. Further, the personal computer 300 has a connection function to a communication line 301. A computer 302 is a server computer that provides the program and stores the program in a recording medium such as a hard disk 303. The computer 302 reads out the program using the hard disk 303, and transmits the program to the personal computer 300 via the communication line 301. In other words, the program is carried by a carrier wave as a data signal and transmitted via the communication line 301. In this way, the program can be supplied as computer readable computer program products in various forms such as recording media and carrier waves.

In the embodiment described above, it is assumed that the operator of the unmanned aerial vehicle 11 monitors the vehicle 11 by visual observation; however, a person monitoring the unmanned aerial vehicle 11 is not limited to the operator. For example, in the case of providing an observer who is in charge of the monitoring, separately from the operator, an authentication process and an estimation process may be performed for the observer. In the case of an autonomous flight according to instructions from the server 13, an observer may also be separately employed and it is estimated whether or not the observer can visually observe the vehicle.

While various embodiments and modifications have been described above, the present invention is not limited thereto. Other aspects conceivable within the technical idea of the present invention are also included in the scope of the present invention. Further, any combinations of various embodiments and modifications may be used.

The disclosures of the following priority applications are herein incorporated by reference:

Japanese Patent Application No. 2016-72510 (filed on Mar. 31, 2016)

Japanese Patent Application No. 2016-72511 (filed on Mar. 31, 2016)

Japanese Patent Application No. 2016-72512 (filed on Mar. 31, 2016)

REFERENCE SIGNS LIST

11 . . . unmanned aerial vehicle, 12 . . . remote controller, 13 . . . server, 14 . . . communication network, 20 . . . head mounting device, 111 . . . flight unit, 112 . . . flight control unit, 113a, 113b . . . image-capturing unit, 114 . . . image-capturing control unit, 115, 123 . . . position detection unit, 116, 122, 131 . . . communication unit, 117 . . . main control unit, 118 . . . obstacle detection unit, 121 . . . display unit, 132 . . . storage unit, 133 . . . control unit, 1331 . . . setting unit, 1332 . . . estimating unit, 200 . . . light emitting device, 204 . . . communication device, 206 . . . line-of-sight direction detecting device

The invention claimed is:

1. A flying device comprising:
a flight unit;
an image capturing unit configured to capture an image of a user to acquire an image data; and
a flight control unit configured to determine whether the flying device is currently visible from the user or whether the flying device is not currently visible from the user even though the flying device is located at a distance at which the user can visibly observe the flying device based on the image data and to perform, in a case where the flying device is determined to be not currently visible from the user, a control that is different from a control in a case where the flying device is determined to be currently visible from the user.

2. The flying device according to claim 1, wherein:
the flight control unit performs a first control when the flying device is determined to be not currently visible from the user and performs a second control when the flying device is determined to be currenlty visible from the user.

3. The flying device according to claim 2, further comprising:
an acquiring unit that acquires information on the user, wherein:
the flight control unit switches between the first control and the second control based on the information on the user.

4. The flying device according to claim 3, wherein:
the acquiring unit acquires information on a positional relationship between the user and the flying device; and
the flight control unit switches between the first control and the second control based on the information on the positional relationship.

5. The flying device according to claim 4, wherein:
the acquiring unit acquires information on the distance to the user; and
the flight control unit performs the first control when the distance is greater than a predetermined value.

6. The flying device according to claim 4, wherein:
the acquiring unit acquires information on an object between the user and the flying device; and
the flight control unit performs the first control when the flying device is obstructed from the user by the object.

7. The flying device according to claim 3, wherein:
the acquiring unit acquires information on a line-of-sight direction of the user; and
the flight control unit performs the first control when the line-of-sight direction is different from a direction from the user to the flying device.

8. The flying device according to claim 2, wherein:
the flight control unit performs the first control when a size of a face of the user included in the image data is smaller than a predetermined size.

9. The flying device according to claim 2, wherein:
the flight control unit performs the first control when a face of the user is not included in the image data.

10. The flying device according to claim 2, wherein:
the first control is a control that causes the flight unit to hover.

11. The flying device according to claim 2, wherein:
the first control is a control that causes the flight unit to fly into a range in which the flying device is visible from the user.

12. The flying device according to claim 2, wherein:
the first control is a control that causes the flight unit to fly to a preset position.

13. The flying device according to claim 2, wherein:
the first control is a control that causes the flight unit to fly in a direction based on the image data.

14. The flying device according to claim 2, wherein:
the second control is a control that causes the flight unit to fly based on a signal from a device held by the user or a control that causes the flight unit to fly along a predetermined route.

15. The flying device according to claim 2, wherein:
the first control is a control that causes the flight unit not to fly based on a signal from a device held by the user.

16. The flying device according to claim 1, wherein:
the flight control unit determines a direction in which the flight unit flies, based on the image data and a predetermined condition.

17. The flying device according to claim 1, further comprising:
a positional information acquiring unit that acquires positional information, wherein:
the positional information acquiring unit acquires the positional information after causing the flight unit to fly in a direction determined by the flight control unit.

18. A non-transitory computer-readable recording medium on which is recorded a program that causes a computer to perform:
capturing an image of a user to acquire an image data;
determining whether a flying device is currently visible from the user or whether the flying device is not currently visible from the user even though the flying device is located at a distance at which the user can visibly observe the flying device based on the image data; and
performing, in a case where the flying device is determined to be not currently visible from the user, a control that is different from a control in a case where the flying device is determined to be currently visible from the user.

19. A flying device comprising:

a flight unit;

an image capturing unit configured to capture an image of a user to acquire an image data; and a flight control unit configured to (i) determine whether the flying device is currently being looked at by the user or whether the user has currently lost sight of the flying device even though the flying device is located at a distance at which the user can visibly observe the flying device based on the image data acquired from the image of the user captured by the image capturing unit and (ii) to perform, in a case where the flight control unit determines that the user has currently lost sight of the flying device, a control of the flying device that is different from a control of the flying device in a case where the flying device is determined to be currently looked at by the user.

\* \* \* \* \*